United States Patent
Marcks et al.

(10) Patent No.: US 11,028,585 B2
(45) Date of Patent: Jun. 8, 2021

(54) BRIDGE TUBE SUPPORT

(71) Applicants: Randy Marcks, St. Ansgar, IA (US); Ryan Olson, Dows, IA (US)

(72) Inventors: Randy Marcks, St. Ansgar, IA (US); Ryan Olson, Dows, IA (US)

(73) Assignee: SUKUP MANUFACTURING CO., Sheffield, IA (US)

(*) Notice: Subject to any disclaimer, the term of this patent is extended or adjusted under 35 U.S.C. 154(b) by 2 days.

(21) Appl. No.: 16/251,775

(22) Filed: Jan. 18, 2019

(65) Prior Publication Data
US 2019/0226208 A1 Jul. 25, 2019

Related U.S. Application Data

(60) Provisional application No. 62/619,544, filed on Jan. 19, 2018.

(51) Int. Cl.
*E04C 3/04* (2006.01)
*E04H 7/22* (2006.01)
(Continued)

(52) U.S. Cl.
CPC .................. *E04C 3/04* (2013.01); *E04B 5/10* (2013.01); *E04B 5/48* (2013.01); *E04C 3/08* (2013.01);
(Continued)

(58) Field of Classification Search
CPC . E04G 23/0266; B65G 1/02; E04C 2003/026; E04C 3/02; E04C 5/16;
(Continued)

(56) References Cited

U.S. PATENT DOCUMENTS 2,912,197 A * 11/1959 Hudson .................... E04B 5/48
248/49
2,964,807 A * 12/1960 Kennedy ................... E04C 3/02
52/696

(Continued)

OTHER PUBLICATIONS

L & J Industries, Inc; 700 Bridge Tube System Apr. 30, 2014.
(Continued)

*Primary Examiner* — Ryan D Kwiecinski
*Assistant Examiner* — Matthew J Gitlin
(74) *Attorney, Agent, or Firm* — Christopher A. Proskey; BrownWinick Law Firm

(57) ABSTRACT

A floor support system for a grain bin having an elevated floor formed of a plurality of planks and supported by a plurality of floor supports is presented. The system includes a plurality of support members and a plurality of holding members. The support members are formed of an elongated member that provides structural strength and rigidity. The holding members fit over the support members and engage the upper end of the floor supports. The support members and holding members are quickly and easily installed by placing the support members on the floor supports and placing the holding members over the support members. Once the support members and holding members are in place on the floor supports, the elevated floor is assembled over the holding members and support members that provide support to the elevated floor when spanning increased distances between adjacent floor supports.

28 Claims, 16 Drawing Sheets

(51) Int. Cl.
*E04B 5/48* (2006.01)
*E04B 5/10* (2006.01)
*E04C 3/08* (2006.01)

(52) U.S. Cl.
CPC .......... *E04H 7/22* (2013.01); *E04C 2003/046* (2013.01); *E04C 2003/0465* (2013.01); *E04C 2003/0473* (2013.01); *E04C 2003/0491* (2013.01)

(58) Field of Classification Search
CPC ................. E04B 7/022; E04B 1/2608; E04B 2001/2684; E04B 2/56; E04B 5/12; E04H 7/30; Y02A 40/55; E04F 15/02447; E04F 15/02452; E04F 15/02458; E04F 2015/02066; E04F 15/02044; E04F 2015/0205
See application file for complete search history.

(56) References Cited

U.S. PATENT DOCUMENTS

| | | | | | |
|---|---|---|---|---|---|
| 3,283,459 | A * | 11/1966 | Beranek | ............... | B65D 88/742 52/263 |
| 3,426,445 | A * | 2/1969 | Steffen | ................. | B65D 88/742 34/233 |
| 3,591,994 | A * | 7/1971 | Steffen | ................. | B65D 88/742 52/308 |
| 4,246,736 | A * | 1/1981 | Kovar | ....................... | E04C 3/02 52/696 |
| 4,282,694 | A * | 8/1981 | Mead | ..................... | F26B 25/10 34/233 |
| 4,592,186 | A * | 6/1986 | Braginetz | ............. | E04B 1/2604 403/396 |
| 4,619,085 | A * | 10/1986 | Carroll | ..................... | E04H 7/30 52/192 |
| 4,858,399 | A * | 8/1989 | Salato, Jr. | ............... | E04B 1/003 52/97 |
| RE33,220 | E * | 5/1990 | Collier | .............. | E04F 15/02452 174/490 |
| 5,148,644 | A * | 9/1992 | Weir | ........................ | E04B 5/12 52/105 |
| 5,280,692 | A * | 1/1994 | Patey | ........................ | E04B 5/12 52/58 |
| 5,371,985 | A * | 12/1994 | Suttles | .................... | A47F 5/101 52/126.1 |
| 5,412,920 | A * | 5/1995 | Hess | ........................ | E04B 5/12 403/232.1 |
| 5,423,156 | A * | 6/1995 | Nellessen, Jr. | ......... | E04B 2/707 403/232.1 |
| 5,551,200 | A * | 9/1996 | Krug | ...................... | E04B 7/022 52/643 |
| 6,418,695 | B1 * | 7/2002 | Daudet | ................... | E04B 7/022 52/639 |
| 6,449,911 | B1 * | 9/2002 | Hudson | .................. | B63B 34/67 52/58 |
| 6,988,346 | B2 * | 1/2006 | Shamroukh | ............. | E04B 7/022 52/654.1 |
| 7,107,727 | B2 * | 9/2006 | Nelsen | .................... | E04B 1/003 52/300 |
| 7,373,759 | B1 * | 5/2008 | Simmons | .............. | E04F 15/024 248/188.1 |
| 8,667,744 | B2 * | 3/2014 | Shaw | ...................... | E04F 15/04 52/97 |
| 9,273,464 | B2 * | 3/2016 | Roen | ......................... | E04B 5/10 |
| 2002/0092259 | A1 * | 7/2002 | Crawford | ................ | E04B 7/022 52/696 |
| 2009/0090549 | A1 * | 4/2009 | Betz | ..................... | H02G 3/0443 174/486 |
| 2009/0120033 | A1 * | 5/2009 | Thomas | .............. | E04D 13/0445 52/773 |
| 2010/0133216 | A1 * | 6/2010 | Lanza-Brache | .......... | B65G 1/02 211/86.01 |
| 2017/0058517 | A1 * | 3/2017 | Mohle | ...................... | E04B 5/48 |
| 2018/0320385 | A1 * | 11/2018 | Canfield | ........... | E04F 15/02458 |

OTHER PUBLICATIONS

Brock Grain Systems; Grain Bin Floors Dec. 31, 2017.
MFS/YORK/STORMOR; GrainMAX Floors Dec. 31, 2017.
GSI; Dura-Lok Flooring Dec. 31, 2011.

* cited by examiner

BRIDGE TUBE SUPPORT

CROSS-REFERENCE TO RELATED APPLICATIONS

This patent application claims priority to provisional patent application Ser. No. 62/619,544 filed on Jan. 19, 2018 entitled "Bridge Tube Support" which is fully incorporated by reference herein.

FIELD OF THE DISCLOSURE

This disclosure relates to grain storage devices used in agriculture. More specifically and without limitation, this disclosure relates to a bridge tube support for the elevated floors of grain bins.

BACKGROUND OF THE DISCLOSURE

Grain bins are massive structures used to store bulk flowable grain products such as corn, soybeans, wheat, rice, or any other grain products or other material. Conventional grain bins are generally formed in a cylindrical shape with a corrugated sidewall covered by a peaked roof. Grain bins vary in height (ranging from twenty feet high to over a hundred and fifty feet high), and diameter, (ranging from eighteen feet in diameter to over a hundred and fifty feet in diameter). The storage capacity of modern grain bins can range anywhere from a few thousand bushels to well over a million bushels.

Typically grain bins have an elevated floor formed of a plurality of planks that are supported by a plurality of floor supports that are positioned in spaced alignment to one another. These floor supports rest upon the foundation of the grain bin and provide support to the elevated floor. The space formed between the foundation and the elevated floor facilitates airflow below the elevated floor. Air blown into this space below the elevated floor passes through perforations in the planks of the elevated floor and through the grain stored in the grain bin. In this way, grain stored within the grain bin is conditioned using air flow through the grain.

Due to the immense weight supported by the elevated floor, the floor supports must be placed close to one another to provide adequate support to the planks of the elevated floor. If the floor supports are spaced too far away from one another, then the elevated floor has a tendency to sag or collapse between the excessively spaced floor supports.

However, in some situations it is necessary to position adjacent floor supports at an increased distance to one another. As an example, it is often necessary to position adjacent floor supports at a greater distance to one another to make room for a grain unloading system, such as an auger or drag conveyor. In this situation, it may be necessary to provide additional support for the planks of the elevated floor to bridge the increased distance between adjacent floor supports so as to prevent the elevated floor from sagging or collapsing. However, presently there is no adequate way to provide bridging support between adjacent floor supports. That is, presently there is no quick, easy, inexpensive and efficient manner of providing additional support for the planks of an elevated floor of a grain bin.

One example of an existing floor support system is manufactured by L & J Industries, Inc. having an address of 1811 Cleveland Ave., P.O. Box 274, Charles City, Iowa 50616 entitled "Type C: Center-Bridge Tubes for Large Unloading Equipment". These devices are essentially formed of a length of a bar with tabs welded onto the ends of the bar. The welding process is an additional manufacturing step and increases the cost of the product and complicates the manufacturing process.

Therefore, for all the reasons stated above, and the reasons stated below, there is a need in the art for an improved bridge tube support system that supports an elevated floor of a grain bin.

Thus, it is a primary object of the disclosure to provide a bridge tube support system that supports an elevated floor of a grain bin that improves upon the state of the art.

Another object of the disclosure is to provide a bridge tube support system that supports an elevated floor of a grain bin that provides adequate support to span increased distances.

Yet another object of the disclosure is to provide a bridge tube support system that supports an elevated floor of a grain bin that is fast to install.

Another object of the disclosure is to provide a bridge tube support system that supports an elevated floor of a grain bin that is efficient.

Yet another object of the disclosure is to provide a bridge tube support system that supports an elevated floor of a grain bin that is relatively inexpensive.

Another object of the disclosure is to provide a bridge tube support system that supports an elevated floor of a grain bin that is easy to install.

Yet another object of the disclosure is to provide a bridge tube support system that supports an elevated floor of a grain bin that holds a support member in place.

Another object of the disclosure is to provide a bridge tube support system that supports an elevated floor of a grain bin that can be used with practically any grain bin.

Yet another object of the disclosure is to provide a bridge tube support system that supports an elevated floor of a grain bin that can be used with practically any floor support.

Another object of the disclosure is to provide a bridge tube support system that supports an elevated floor of a grain bin that can be used with practically any elevated floor.

Yet another object of the disclosure is to provide a bridge tube support system that supports an elevated floor of a grain bin that does not require welding.

Another object of the disclosure is to provide a bridge tube support system that supports an elevated floor of a grain bin that does not require bolting.

Yet another object of the disclosure is to provide a bridge tube support system that supports an elevated floor of a grain bin that prevents a support member from escaping.

Another object of the disclosure is to provide a bridge tube support system that supports an elevated floor of a grain bin that uses a light duty holding member to hold a heavy duty support member.

Yet another object of the disclosure is to provide a bridge tube support system that supports an elevated floor of a grain bin that prevents sagging or collapse of the elevated floor.

Another object of the disclosure is to provide a bridge tube support system that supports an elevated floor of a grain bin that has a long useful life.

Yet another object of the disclosure is to provide a bridge tube support system that supports an elevated floor of a grain bin that is durable.

Another object of the disclosure is to provide a bridge tube support system that supports an elevated floor of a grain bin that utilizes simple manufacturing processes.

Yet another object of the disclosure is to provide a bridge tube support system that supports an elevated floor of a grain bin that has a robust design.

Another object of the disclosure is to provide a bridge tube support system that supports an elevated floor of a grain bin that is high quality.

Yet another object of the disclosure is to provide a bridge tube support system that supports an elevated floor of a grain bin that can be installed using conventional equipment and tools.

Another object of the disclosure is to provide a bridge tube support system that supports an elevated floor of a grain bin that can be installed by hand.

Yet another object of the disclosure is to provide a bridge tube support system that supports an elevated floor of a grain bin that helps to prevent the floor supports from tipping over.

Another object of the disclosure is to provide a bridge tube support system that supports an elevated floor of a grain bin that can be installed at adjustable distances from one another.

Yet another object of the disclosure is to provide a bridge tube support system that supports an elevated floor of a grain bin that does not require fastening to the floor supports.

Another object of the disclosure is to provide a bridge tube support system that supports an elevated floor of a grain bin that does not require welding or bolting to form for install.

These and other objects, features, or advantages of the disclosure will become apparent from the specification, figures and claims.

SUMMARY OF THE DISCLOSURE

A floor support system for a grain bin having an elevated floor formed of a plurality of planks and supported by a plurality of floor supports is presented. The system includes a plurality of support members and a plurality of holding members. The support members are formed of an elongated member that provides structural strength and rigidity. The holding members fit over the support members and engage the upper end of the floor supports. In this way, the support members and holding members are quickly and easily installed by placing the support members on the floor supports and placing the holding members over the support members. Once the support members and holding members are in place on the floor supports, the elevated floor is assembled over the holding members and support members that provide support to the elevated floor when spanning increased distances between adjacent floor supports.

DETAILED DESCRIPTION OF THE DISCLOSURE

Figure 1:
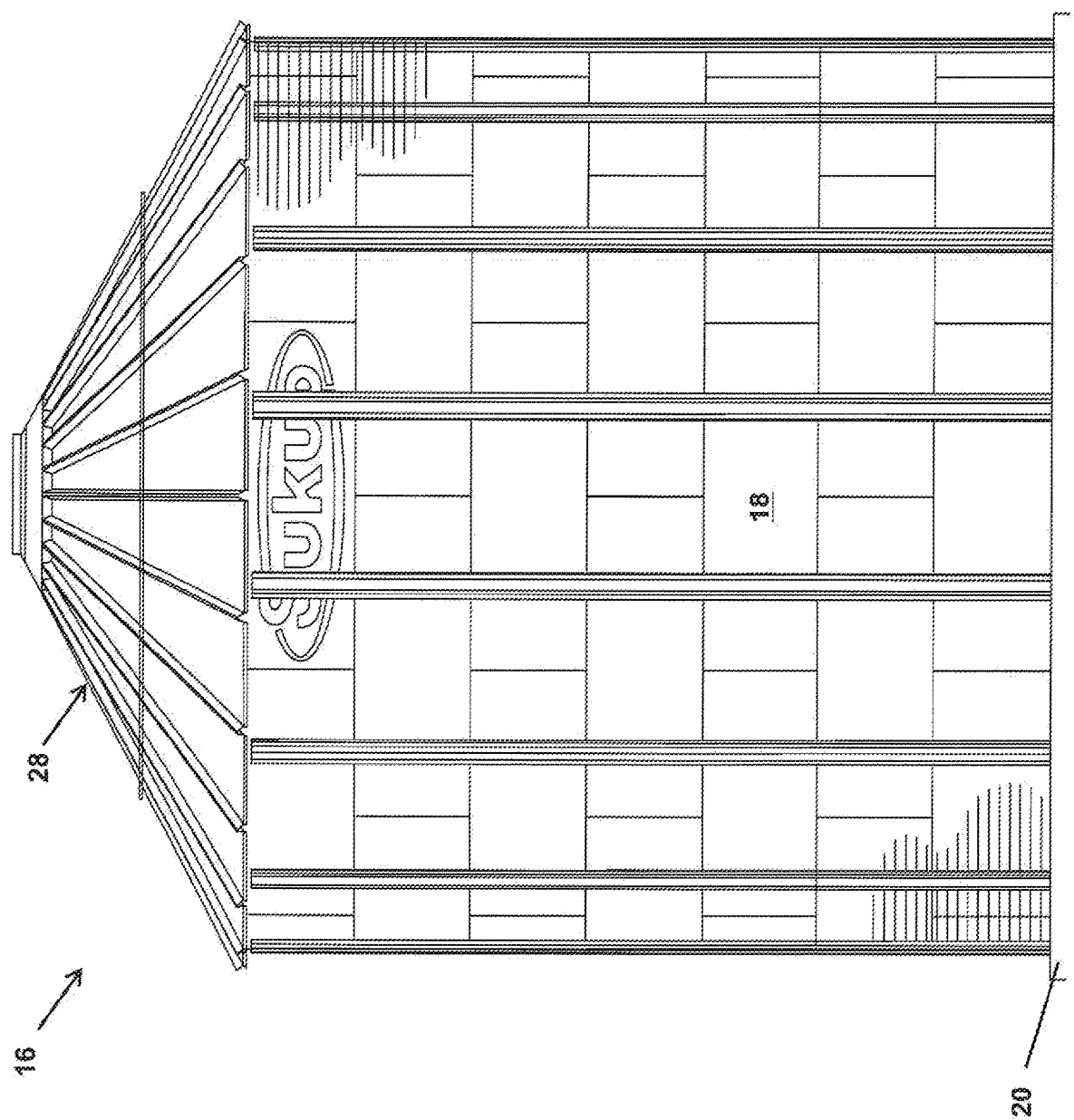
FIG. 1 is a an elevation view of a conventional grain bin; the view showing the grain bin having a foundation, a cylindrical sidewall and a peaked roof.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

System:

With reference to the figures, a bridge tube support system 10 (system 10) is presented that includes a plurality of support members 12 used in association with a plurality of holding members 14 for use in a grain bin 16 having a sidewall 18, a foundation 20 and an elevated floor 22 formed of a plurality of planks 24 that are supported by a plurality of floor supports 26.

Grain Bin:

In the arrangement shown, bridge tube support system 10 is used in association with a grain bin 16. Grain bin 16 may be formed of any suitable size, shape and design and is configured to hold a bulk amount of flowable material such as grain or the like materials. In one arrangement, as is shown, grain bin 16 is a large, generally cylindrical structure that has a curved sidewall 18 that forms a hollow interior. Sidewall 18 connects at its lower end to a foundation 20 which provides support to the sidewall 18. Sidewall 18 connects at its upper end to a peaked roof 28.

In the arrangement shown, as one example, an elevated floor 22 formed of a plurality of planks 24 is housed within the hollow interior of grain bin 16. This elevated floor 22 is supported by a plurality of floor supports 26. The plurality of floor supports 26 are themselves supported by the foundation 20 of the grain bin 16.

Floor Supports:

Floor supports 26 are formed of any suitable size, shape and design and are configured to provide support for elevated floor 22 as well as facilitate airflow between foundation 20 and elevated floor 22. In one arrangement, as is shown, floor supports 26 are formed upper members 30, lower members 32 and middle members 34 that extend between upper members 30 and lower members 32.

Upper members 30 are formed of any suitable size, shape and design and are configured to connect the upper end of a plurality of middle members 34 that form each floor support 26. Upper members 30 are also configured to provide a mounting surface for elevated floor 22 to rest upon. In one arrangement, as is shown, upper members 30, when viewed from the side, are formed of an elongated L-shaped member. That is, in the arrangement shown, upper member 30 includes an upper tab 36 that forms a generally flat upper surface and lower surface that extend in approximate parallel spaced alignment to one another, and a side tab 38, that extends downward along one side of the upper end of middle members 34 that forms a generally flat inner surface and a lower surface that extend in approximate parallel spaced alignment to one another. In the arrangement shown, upper tab 36 and side tab 38 are generally flat and planar in shape and extend in approximate perpendicular planar alignment to one another, thereby forming the L-shaped member. The use of an L-shaped member for upper members 30 provides additional strength and rigidity to the upper end of floor supports 26. However, any other shape or component is hereby contemplated for use as upper member 30, such as a square tube, an I-beam, a C-shaped channel, or any other structural member or the like. The upper end of middle members 34 connect to the lower surface of upper tab 36 and/or the inner surface of side tab 38 by any manner or method such as welding, bolting, gluing, affixing, locking, friction fitting, threading, or forming the components out of a single piece of material such as stamping, machining, molding, casting, or by any other manner or method or the like.

Lower members 32 are formed of any suitable size, shape and design and are configured to connect the lower end of a plurality of middle members 34 that form each floor support 26. Lower members 32 are also configured to provide a support surface that rests upon the upper surface of foundation 20 thereby providing stability to floor support 26. In one arrangement, as is shown, lower members 32, when viewed from the side, are formed of an elongated flat bar or rectangular shaped member having a generally flat upper surface and lower surface that extend in approximate parallel spaced alignment to one another. That is, in the arrangement shown, lower member 32 includes a generally flat lower surface that generally sits upon the generally flat upper surface of foundation 20 and a generally flat upper surface that engages the lower end of a plurality of middle members 34. However, any other shape or component is hereby contemplated for use as lower member 32, such as an angle iron, square tube, an I-beam, a C-shaped channel, or any other structural member or the like. The lower end of middle members 34 connect to the upper surface of lower member 32 by any manner or method such as welding, bolting, gluing, affixing, locking, friction fitting, threading, or forming the components out of a single piece of material such as stamping, machining, molding, casting, or by any other manner or method or the like.

Middle members 34 are formed of any suitable size, shape and design and are configured to connect the upper members 30 and lower members 32 that form each floor support 26. Middle members 34 are also configured to provide support, strength and rigidity between upper members 30 and lower members 32 while also providing for air flow between upper members 30 and lower members 32. In one arrangement, as is shown, middle members 34 are cylindrical rods that connect at their lower end to the upper surface of lower members 32, and connect at their upper end to the lower surface of the upper tab 36 and/or the inward face of side tab 38 of upper member 30. However, any other shape or component is hereby contemplated for use as lower member 32. The upper and lower ends of middle members 34 connect to the upper member 30 and lower member 32 by any manner or method such as welding, bolting, gluing, affixing, locking, friction fitting, threading, or forming the components out of a single piece of material such as stamping, machining, molding, casting, or by any other manner or method or the like.

In the arrangement shown, as one example, floor supports 26 extend an elongated length between opposing ends in a generally straight fashion. However, in other arrangements, it is hereby contemplated that floor supports 26 extend in a curved, angled, zig-zag or other non-linear or non-straight fashion.

In the arrangement shown, each floor support 26 is formed of a plurality of components, namely upper members 30, lower members 32 and a plurality of middle members 34 that are connected to one another, often by welding. However, in another arrangement, floor supports 26 may be formed by other manners or methods including, but not limited to, being formed of a single, monolithic, component that is formed by cutting or stamping and/or bending. An example of this monolithic floor support 26 is shown and described in Applicant's U.S. Pat. No. 8,297,016 issued on Oct. 30, 2012 entitled "Support for a grain bin floor and method of making the same" which is fully incorporated by reference herein. Any other form of a floor support 26 is hereby contemplated for use in association with system 10.

In the arrangement shown, as one example, a plurality of floor supports 26 are positioned across the foundation 20 in approximate equal-spaced alignment. In this way, this grid or array of floor supports 26 provides even support for the planks 24 of elevated floor 22 to rest upon.

Elevated Floor & Planks:

Elevated floor 22 is formed of any suitable size, shape and design and is configured to support a mass of grain poured within the hollow interior of grain bin 16. In one arrangement, as is shown, elevated floor 22 rests upon the upper surface of upper members 30 of floor supports 26 and establishes a generally planar upper surface.

In one arrangement, as is shown, elevated floor 22 is formed of a plurality of planks 24. Planks 24 are formed of any suitable size, shape and design and are configured to connect to one another to form elevated floor 22.

In one arrangement, as is shown, planks 24 extend in a generally straight manner between opposing ends. In the arrangement shown, as one example, planks 24 include a center wall 40 that is generally flat and planar in shape. Center wall 40 connects at its outward edges to sidewalls 42. In one arrangement, center wall 40 has a plurality of openings or perforations therein that are large enough to allow air flow through the elevated floor 22 but not so large that grain can fall through the perforations.

Sidewalls 42 are generally flat and planar in shape. Opposing sidewalls 42 extend downward from the outward edges of center wall 40 in approximate parallel spaced alignment to one another. Opposing sidewalls 42 extend downward from the outward edges of center wall 40 in approximate perpendicular alignment to the plane formed by center wall 40. The lower end of sidewalls 42 connect to end walls 44.

End walls 44 are generally flat and planar in shape. The plane formed by end walls 44 extends in approximate perpendicular alignment to the plane formed by sidewalls 42. The plane formed by end walls 44 extends in approximate parallel spaced alignment to the plane formed by center wall 40. In the arrangement shown, as one example, end walls 44 are connected to the lower end of each of the sidewalls 42 and the opposing end walls 44 extend in the same direction as one another. As such, one end wall 44 extends away from center wall 40 and is exposed while the other end wall 44 extends under center wall 40 and is covered by center wall 40. Tabs 46 connect to the ends of end walls 44 opposite the ends that connect to the lower end of sidewalls 42.

Tabs 46 are generally flat and planar in shape and extend upward from the end of end walls 44 in approximate parallel spaced alignment to one another. The plane formed by tabs 46 extends in approximate perpendicular alignment to the plane formed by end walls 44 and center wall 40. The plane formed by tabs 46 extends in approximate parallel spaced alignment to the plane formed by sidewalls 42. In the arrangement shown, as one example, the exposed tab 46, which is the tab that is not positioned under center wall 40, is slightly taller than the tab 46 that is positioned below the center wall 40. However, in another arrangement, the tabs 46 are of equal length.

Any other shape or configuration is hereby contemplated for use for planks 24. In the arrangement shown, the combination of bends and shapes that form planks 24 provides strength and rigidity to planks 24 in much the same way that corrugation provides strength and rigidity to a sheet of sheet metal.

The planar lower surface formed by end walls 44 forms an extended rest surface and is configured to rest upon the upper surface of upper members 30. The combination of the sidewall 42, end walls 44 and tabs 46 forms a socket 48. Socket 48 of the exposed end wall 44 is configured to receive the end wall 44 that is tucked under the center wall 40 of the adjacent plank 24 in close and tight and nesting frictional engagement. In this way, each plank 24 connects to and nests with the planks 24 positioned on either side of the plank 24. That is, for each plank 24, the end wall 44 that is positioned under center wall 40 fits within the exposed socket 48 of the plank 24 on one side; and the socket 48 on the opposite side of the plank 24 receives the end wall 44 of the next plank 24. In this way, the elevated floor 22 is formed of a plurality of connected planks 24.

The intrinsic strength and rigidity of planks 24 allows planks 24 to extend across floor supports 26 that are positioned at spaced intervals. However in some situations it is necessary to provide an extended space or extended interval between adjacent floor supports 26, such as to make room for a grain unload system 50, such as an auger 52, or belt or drag chain system 54. To prevent sagging or collapsing in the extended space for grain unload system 50, support members 12 and holding members 14 are used. When planks 24 are positioned on top of the upper surface of upper members 30 of floor supports 26 a space is formed between the lower surface of center wall 40 and the upper surface of upper members 30. Support members 12 and holding members 14 are positioned in this space below center wall 40.

Grain Unload System:

Grain unload system 50 is formed of any suitable size, shape and design and is configured to move grain out of grain bin 16, such as through a sump or other opening in the elevated floor 22. As examples, grain unload system 50 may be formed of an auger 52 or a drag conveyor 54. Any other form of a grain movement device is hereby contemplated for use as grain unload system 50.

When grain unload system 50 is an auger 52, auger 52 is formed of any suitable size, shape and design and is configured to move grain. In one arrangement, as is shown, auger 52 includes a casing 56, a shaft 58 and fighting 60. In the arrangement shown, as one example, casing 56 is formed of an elongated hollow tube. The hollow interior of casing 56 is configured to receive the shaft 58 and flighting 60 with close and tight tolerances so as to facilitate maximum and efficient movement of grain. In the arrangement shown, as one example, shaft 58 is an elongated cylindrical member that extends through the approximate center of the hollow interior of casing 56 and facilitates rotation of fighting 60 within casing 56. In the arrangement shown, as one example, fighting 60 is formed of a helical screw blade that is connected adjacent its inner edge to shaft 58 which rotates the fighting 60 and terminates at an outward edge that rotates within casing 56 with the exterior peripheral edge of flighting 60 are terminating within close and tight tolerances to the interior surface of casing 56. In operation, as the shaft 58 and fighting 60 is rotated within casing 56, grain is moved from one end of the auger 52 to the other end of the auger 52.

When grain unload system 50 is a drag conveyor 54, drag conveyor 54 is formed of any suitable size, shape and design and is configured to move grain. In the arrangement shown, as one example, drag conveyor 54 includes a pair of sidewalls 62 that connect at their upper end to the outward edges of an upper wall 64. The lower end of sidewalls 62 connect to the outward edges of a lower wall 66. Sidewalls 62 and upper wall 64 and lower wall 66 form planes that extend in approximate perpendicular alignment to one another and thereby form a generally square or rectangular member. A belt or drag chain is positioned within the hollow interior 68 formed by sidewalls 62, upper wall 64 and lower wall 66.

Generally, the larger, and wider, the grain unload system 50 the greater the amount of grain the grain unload system 50 can move in a given amount of time. However, the larger the grain unload system 50 the greater the amount of space required to fit the grain unload system 50 between adjacent floor supports 26. To facilitate the increased distance between adjacent floor supports 26 additional support may be used, such as supporting members 12 and holding members 14, to prevent planks 24 of elevated floor 22 from sagging.

Support Members:

Support members 12 are formed of any suitable size, shape and design and are configured to provide support to planks 24 of elevated floor 22 across an extended distance between adjacent floor supports 26, such as when a grain unload system 50 is positioned between two floor supports 26. In one arrangement, as is shown, as one example, support members 12 are formed of an elongated piece of square or rectangular pipe or tube. This arrangement provides the benefit that support member 12 is simple to form and does not require advanced secondary manufacturing operations to create. That is, the tube is simply cut to its desired length and then placed upon the upper surface of upper members 30 of floor supports 26. There are no additional welding, bolting or other manufacturing or assembly steps required. Any other form of a device is hereby contemplated for use as a support member 12 including I-beams, C-channel, U-Channel, flat bars, round tubes or any other form of a structural member.

Holding Members:

Holding members 14 are formed of any suitable size, shape and design and are configured to hold support members 12 in place on floor supports 26. In one arrangement, as is shown, holding members 14 are configured to fit over support members 12 and connect to the upper member 30 of adjacent floor supports 26 thereby preventing the support members 12 from sliding off of the upper members 30 of floor supports 26.

That is, one of the benefits of the system 10 presented herein is that support members 12 are simple lengths of a square or rectangular tube or other member that is placed on the upper members 30 of two adjacent floor supports 26. This arrangement is inexpensive to manufacture, as there are no additional manufacturing steps that weld, machine or otherwise add features to the support members 12. This arrangement is also easy to install because the support members 12 are simply placed on top of the upper members 30 of two adjacent floor supports 26 with no additional assembly, installation or attachment steps such as screwing or bolting or riveting or pinning or welding or by any other affixing technique or method.

The support member 12 is simple, inexpensive and easy to install because it does not have any additional features or assembly steps. However, one drawback to this system is that the support member 12 simply rests upon the upper members 30 of adjacent floor supports 26 the support member 12 can shift and move and potentially fall off of the floor supports 26 over time. To correct this problem, holding members 14 are used to anchor the relative position of support members 12.

In one arrangement, as is shown, holding members 14 are elongated members that extend a length between opposing ends 70. In the arrangement shown, as one example, holding member 14 includes a center wall 72 that is generally flat and planar in shape. Center wall 72 connects at its outward edges to opposing sidewalls 74.

Sidewalls 74, like center wall 72, are generally flat and planar in shape. Opposing sidewalls 74 extend downward from the outward edges of center wall 72 in approximate parallel spaced alignment to one another. Opposing sidewalls 74 extend downward from the outward edges of center wall 72 in approximate perpendicular alignment to the plane formed by center wall 72. End walls 76 connect to the outward ends of center wall 72.

End walls 76 are generally flat and planar in shape. Opposing end walls 76 connect to the outward ends of center wall 72 and extend downward therefrom in approximate parallel spaced relation to one another. The plane formed by end walls 76 extends in approximate perpendicular alignment to the plane formed by sidewalls 74. The plane formed by end walls 76 extends in approximate perpendicular alignment to the plane formed by center wall 72.

In this way, the combination and connection of center wall 72, sidewalls 74 and end walls 76 of holding member 14 form a hollow interior 78 that is sized and shaped to receive support member 12 therein. That is, the lower surface of center wall 72, the interior surfaces of opposing sidewalls 74, and the interior surfaces of end walls 76 define the boundary for support member 12 when holding member 14 is placed over support member 12.

In one arrangement, the lower outward end of sidewalls 74 of holding member 14 includes sockets 80 therein.

Sockets 80 are formed of any suitable size, shape and design and are configured to attach holding member 14 to the upper members 30 of opposing floor supports 26. In one arrangement, as is shown, as one example, sockets 80 are formed of a generally square or rectangular slot, when viewed from the side that is sized and shaped to fit over the upper member 30 of floor supports 26 with close and tight tolerances.

In one arrangement, as is shown, sockets 80 are formed of a pair of opposing flanges or tabs 82 that connect at their upper end to the sidewall 74 and extend downward therefrom a distance. In the arrangement shown, as one example, flanges or tabs 82 are formed of an extension of the material that forms sidewall 74 and therefore flanges or tabs 82 extend in generally flat and planar alignment to the plane that sidewalls 74 form. In one arrangement, as is shown, flanges or tabs 82 are generally straight rectangular or square extensions. In this way, in one arrangement, the inwardly facing edges 84 of opposing flanges or tabs 82 are generally flat and straight and extend in approximate parallel spaced relation to one another. The inward edges 84 of socket 80 connect at their upper end to upper edge 86 that itself is generally flat and straight. In the arrangement shown, the inward edges 84 of socket 80 extend in approximate perpendicular alignment to the upper edge 86 of socket 80 thereby forming a generally square or rectangular slot or groove that is configured to receive the upper end of floor supports 26.

In the arrangement shown, as one example, the upper edge 86 of socket 80 is sized and shaped to receive the upper tab 36 of upper member 30 of floor support 26 with close and tight tolerances and in some arrangements with frictional locking engagement so as to help hold the holding member 14 on the floor support 26. The inward edge 84 of socket 80 is slightly longer than the side tab 38 of upper member 30 of floor support 26 such that when upper member 30 of floor support 26 is positioned within socket 80, the plane of the outside surface of side tab 38 is in flat and flush frictional engagement with the inward edge 84 of socket 80, while the upper surface of upper tab 36 is in flat and flush frictional engagement with the upper edge 86 of socket 80. In this way, the upper end of floor support 26 is held within socket 80 in a stable manner while also facilitating easy installation and removal of holding member 14 onto and off of adjacent floor supports 26

Formation of Support Members and Holding Members:

In one arrangement, as is shown, support members 12 are formed by cutting lengths of an elongated square or rectangular tube or any other structural support member to the desired length. This allows for the use of a standard square or rectangular tube that is common stock and readily available and therefor is extremely cost efficient.

In one arrangement, holding members 14 are formed by cutting a thin sheet of material to include the desired features. Like support member 12, holding member 14 may be formed of a common stock material that is readily available and therefore is extremely cost efficient. In addition, since holding member 14 is not weight-bearing as it simply serves to hold support member 12 in place, the sheet of material that is used for holding member 14 may be thin, which is less expensive and is generally easier to work with as compared to thicker materials. To cut holding member 14, this can quickly, easily and cost effectively be done using a press, laser cutter, plasma cutter, cutting table, CNC, or any other cutting device. Once the sheet of material is cut to include the desired features, the sidewalls 74 are bent downward from center wall 72 along a first bend line 88 and the end walls 76 are bent downward from center wall 72 along a second bend line 90. This can quickly, easily and cost effectively be done using a press, a bender or any other forming device. In this way, holding members 14 are quickly and easily formed with only a cutting step and a bending step. The resulting product includes an upper plane established by center wall 72, side planes established by sidewalls 74 and flanges or tabs 82, and end planes established by end walls 76.

In one arrangement, holding member 14 is formed of a relatively light and thin sheet of material. In this arrangement, holding member 14 does not contribute a large amount of strength or rigidity to support planks 24 of elevated floor 22. In contrast, in this arrangement, the relatively light and thin sheet of material that is used to form holding member 14 is used to keep support member 12 in place while relying upon the strength and rigidity of the support member 12 to provide support for the planks 24 of elevated floor 22. Using a light and thin sheet of material to form holding member 14 eases and simplifies and speeds the manufacturing and/or bending process and makes production of the holding member 14 relatively inexpensive.

Figure 19:
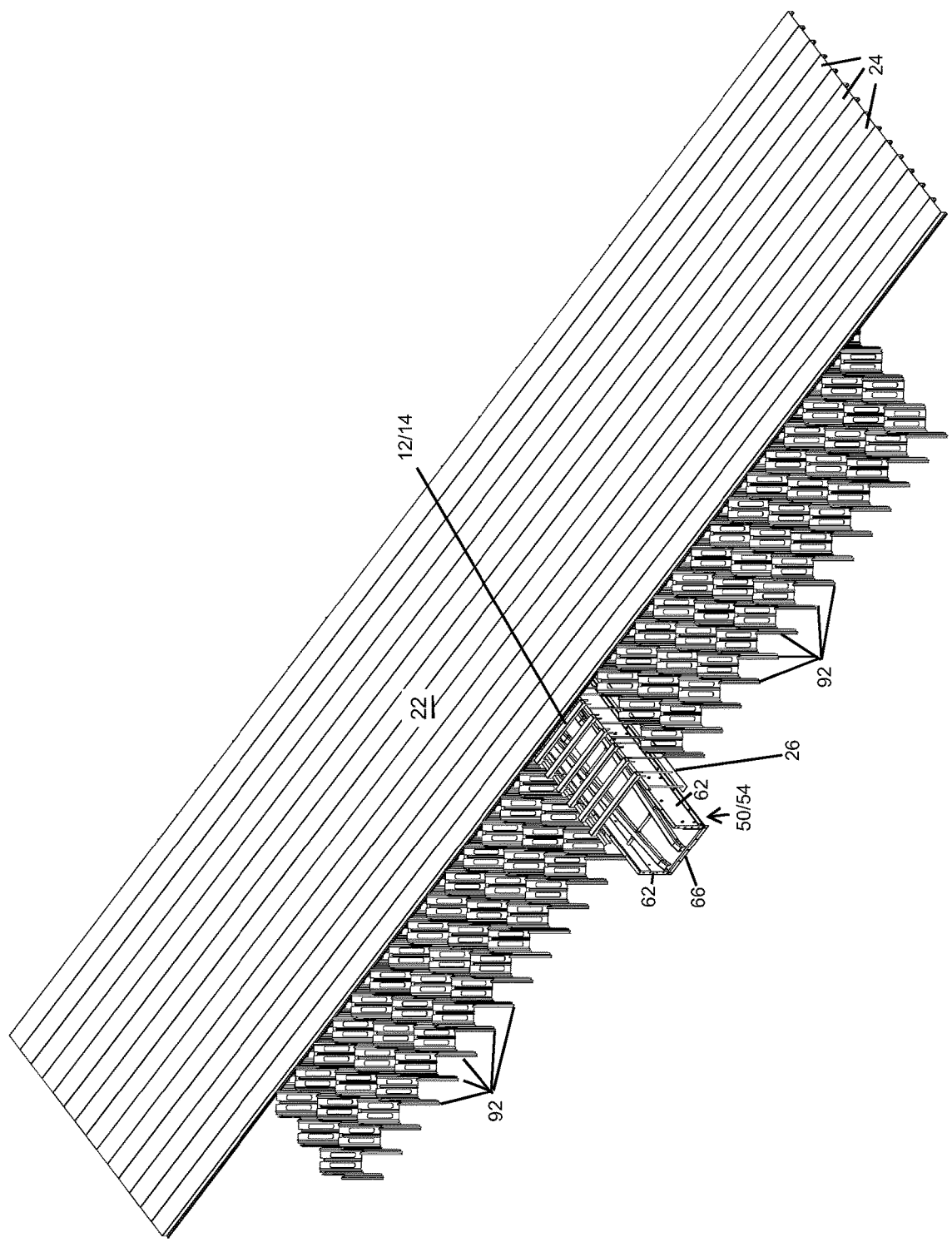
FIG. 19 is a cut-away perspective view within a grain bin; the view showing a plurality of stamped metal floor supports in parallel spaced alignment to one another and resting on the upper surface of the foundation; the view showing a plurality of stamped metal floor supports extending in rows and arranged in end-to-end alignment with one another; the view showing a plurality of stamped metal floor supports having a wave design with air passageways extending through the body of the stamped metal floor supports, and a plurality of tabs extending upward from the upper edge of the stamped metal floor supports that provides support under the crown of the floor planks; the view showing a grain unload system positioned between a pair of spaced floor supports such as those shown in FIGS. 2 and 3, wherein the grain unload system is a belt or drag conveyor having a pair of opposing sidewalls that connect to an opposing upper wall and lower wall; the view showing a plurality of holding members that bridge the increased distance between the floor supports that are positioned next to the grain unload system; the view showing a portion of an elevated floor formed of a plurality of planks assembled on top of the plurality of stamped metal floor supports.

Alternative Embodiment:

In an alternative embodiment, with reference to FIG. 19, a stamped metal floor support 92 is presented. Stamped metal floor supports 92 are formed of any suitable size, shape and design and are configured to provide support for elevated floor 22 as well as facilitate airflow between foundation 20 and elevated floor 22, as well as facilitate in providing added support for planks 24 by providing a crown which fits in with the floor planks 24.

Figure 2:
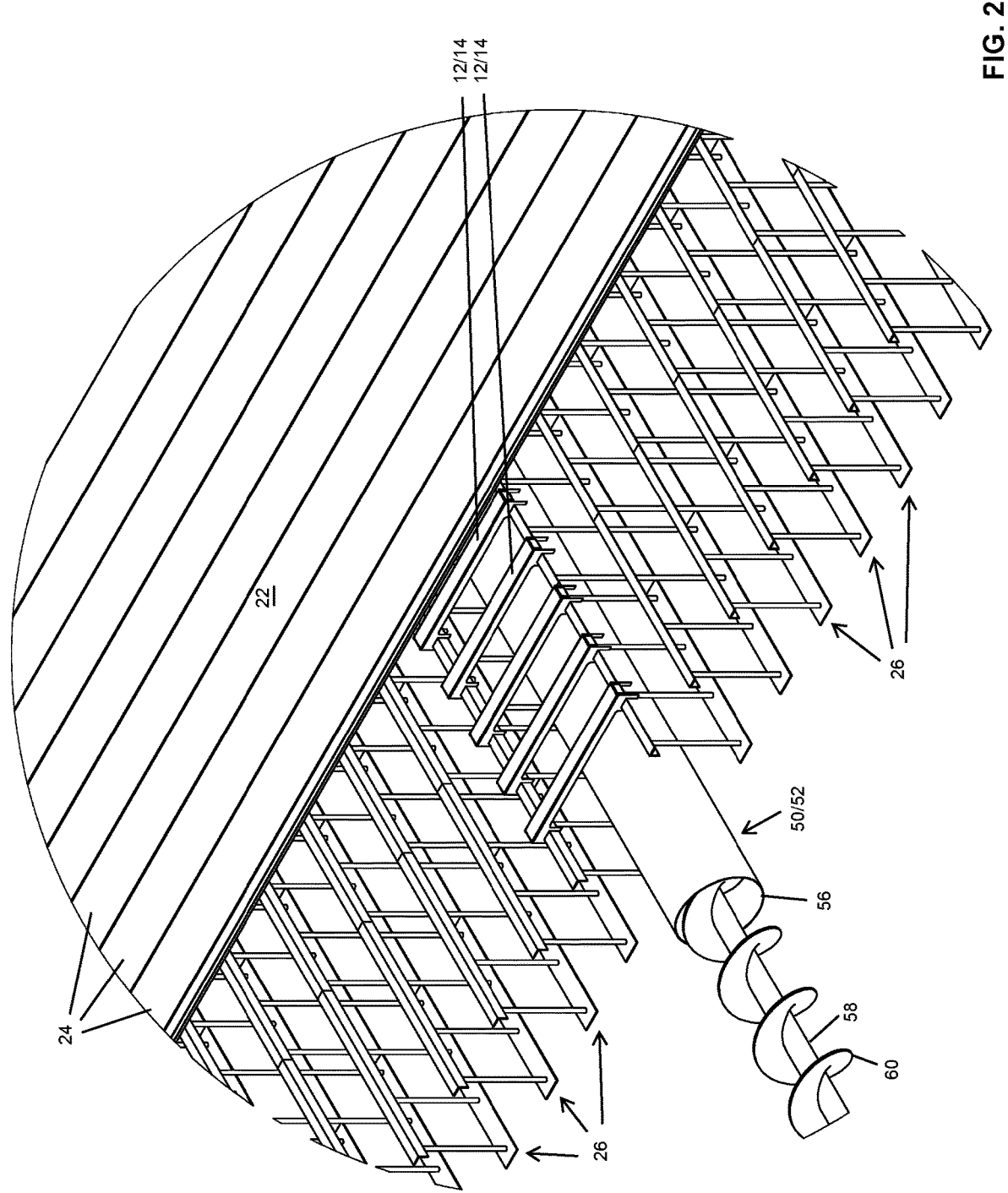
FIG. 2 is a cut away perspective view within a grain bin; the view showing a plurality of floor supports positioned in parallel spaced alignment to one another and resting on the upper surface of the foundation; the view showing the plurality of floor supports extending in straight rows and arranged in end-to-end alignment with one another; the view showing the plurality of floor supports having an upper member formed of an L-shaped member, a lower member formed of a rectangular bar, and a plurality of middle members that extend between the upper member and the lower member that are formed of cylindrical rods; the view showing a grain unload system positioned between a pair of additionally spaced floor supports, wherein the grain unload system is an auger having a casing, a shaft and fighting; the view showing a plurality of holding members placed over support members that bridge the increased distance between floor supports over the grain unload system; the view showing a portion of an elevated floor formed of a plurality of planks assembled on top of the plurality of floor supports.
Figure 3:
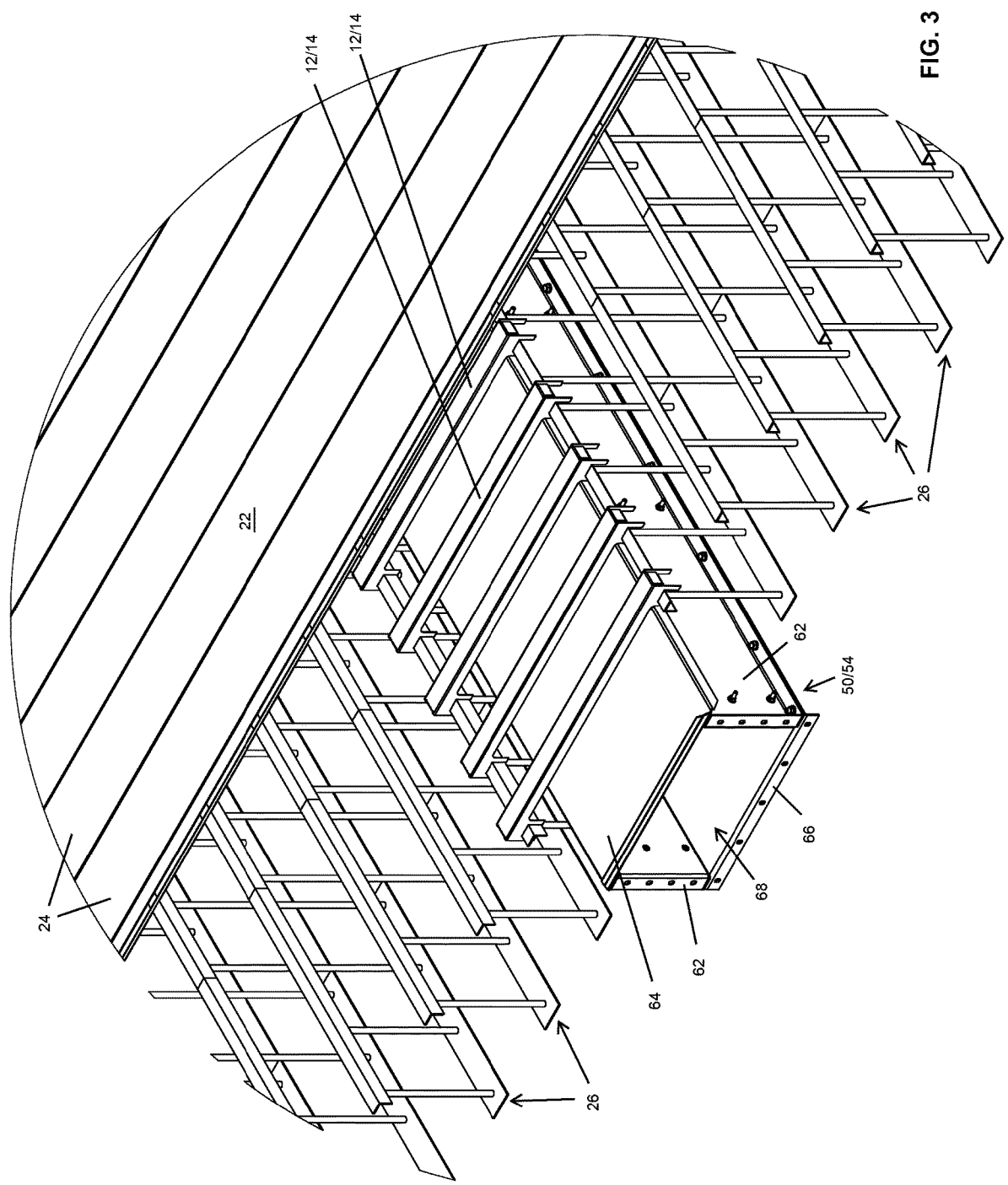
FIG. 3 is a cut away perspective view within a grain bin; the view showing a plurality of floor supports positioned in parallel spaced alignment to one another and resting on the upper surface of the foundation; the view showing the plurality of floor supports extending in straight rows and arranged in end-to-end alignment with one another; the view showing the plurality of floor supports having an upper member formed of an L-shaped member, a lower member formed of a rectangular bar, and a plurality of middle members that extend between the upper member and the lower member that are formed of cylindrical rods; the view showing a grain unload system positioned between a pair of additionally spaced floor supports, wherein the grain unload system is a drag conveyor having a pair of opposing sidewalls that connect to an opposing upper wall and lower wall; the view showing a plurality of holding members placed over a support member that bridge the increased distance between floor supports over the grain unload system; the view showing a portion of an elevated floor formed of a plurality of planks assembled on top of the plurality of floor supports.
Figure 4:
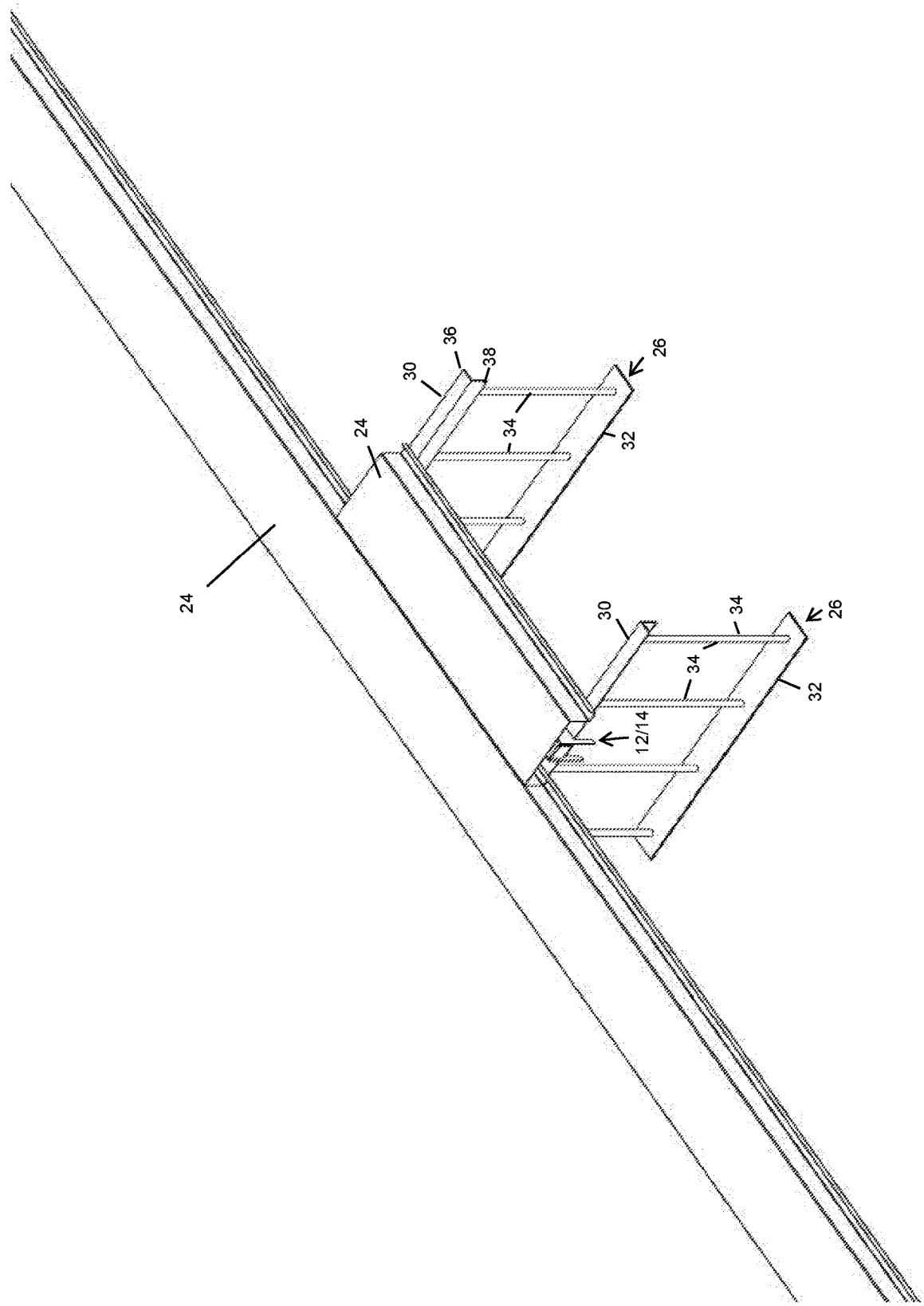
FIG. 4 is a close-up cut away perspective view of a pair of floor supports positioned in parallel spaced alignment to one another; the view showing the floor supports having an upper member formed of an L-shaped member, a lower member formed of a rectangular bar, and a plurality of middle members that extend between the upper member and the lower member that are formed of cylindrical rods; the view showing a holding member placed over a support member that bridge the increased distance between floor supports; the view showing a portion of a plank of an elevated floor placed over the top of the holding member and support member.
Figure 5:
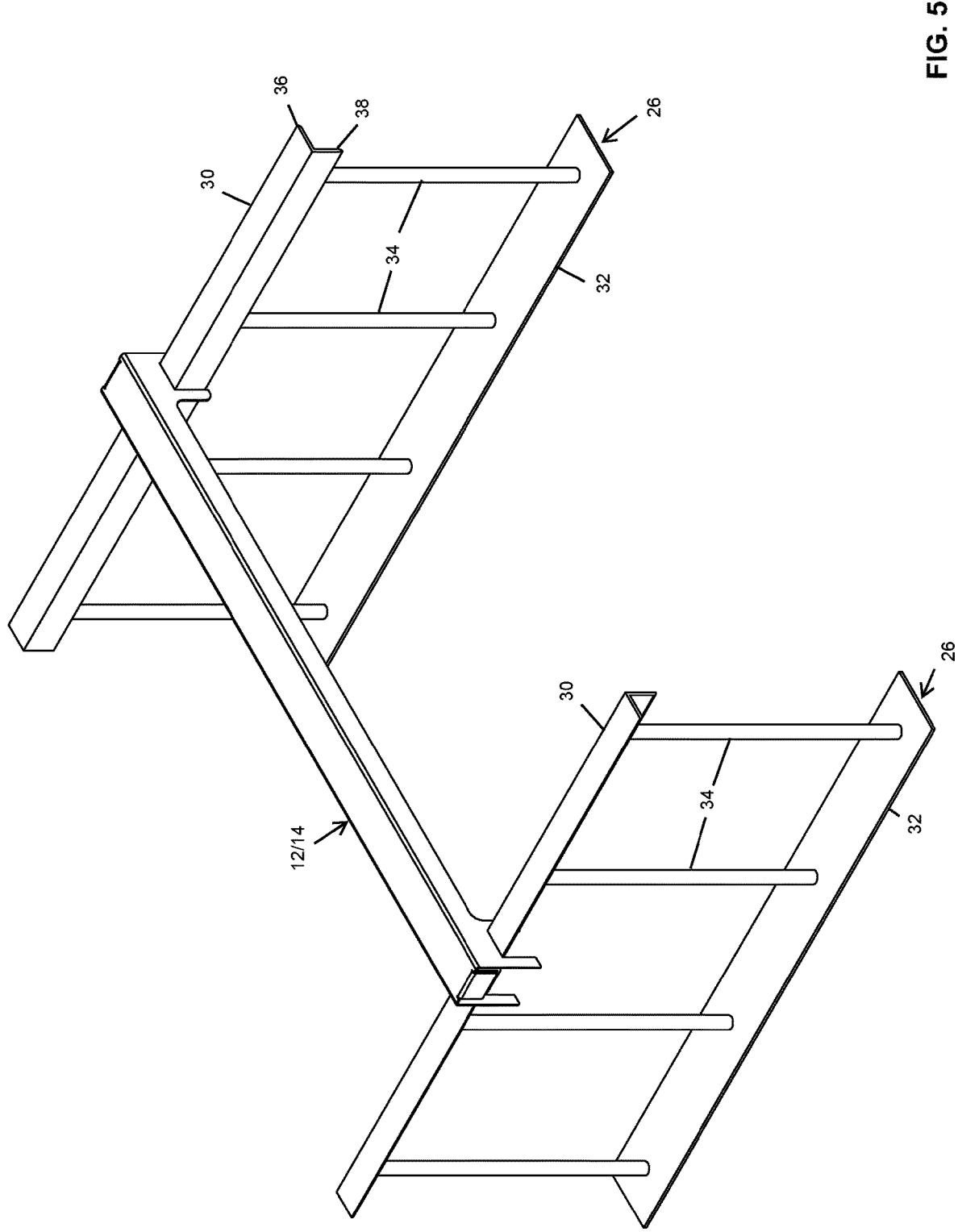
FIG. 5 is a perspective view of a pair of floor supports positioned in parallel spaced alignment to one another; the view showing the floor supports having an upper member formed of an L-shaped member, a lower member formed of a rectangular bar, and a plurality of middle members that extend between the upper member and the lower member that are formed of cylindrical rods; the view showing a holding member placed over a support member that bridge the increased distance between floor supports.
Figure 6:
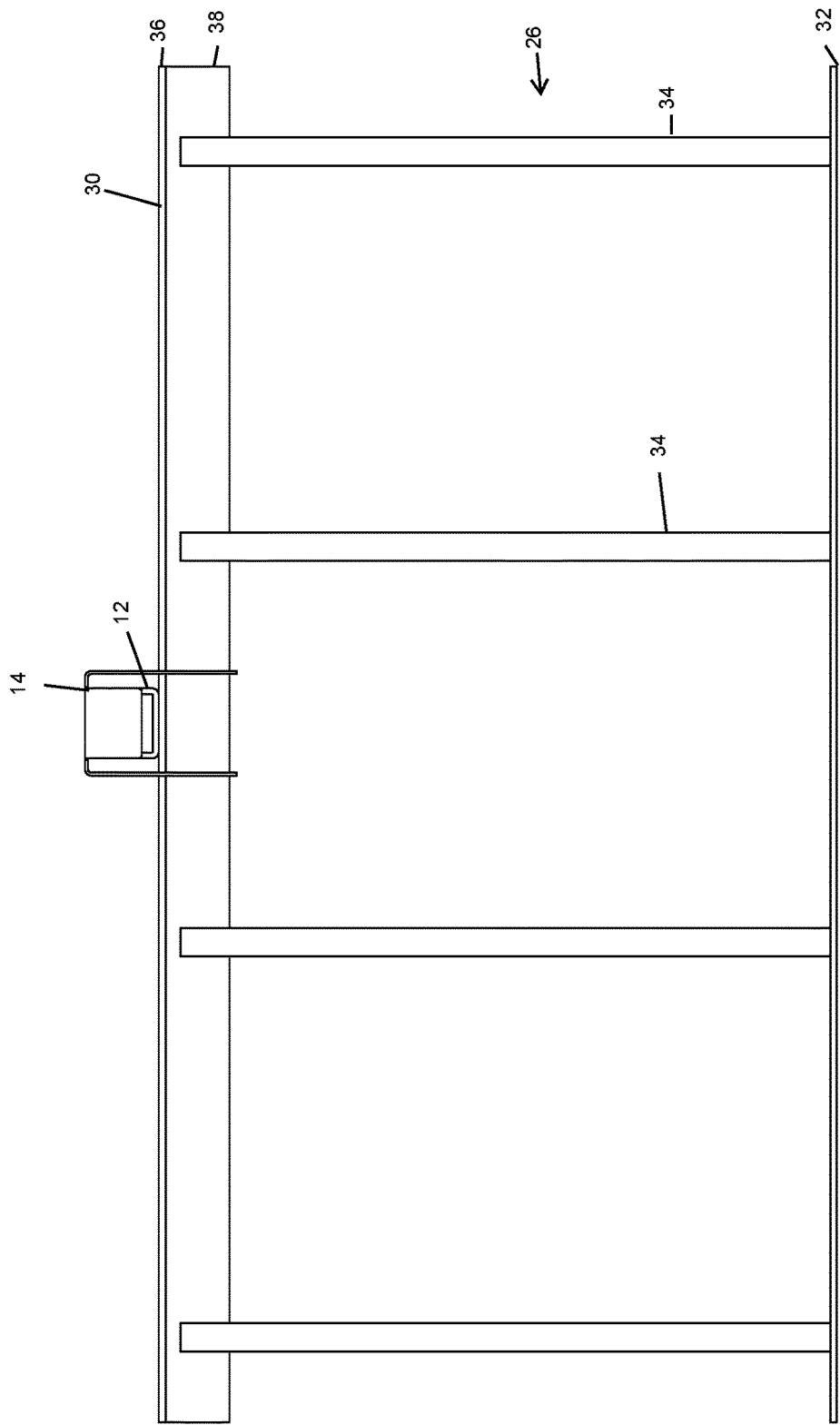
FIG. 6 is a close-up elevation view of a side of a floor support having an upper member formed of an L-shaped member, a lower member formed of a rectangular bar, and a plurality of middle members that extend between the upper member and the lower member that are formed of cylindrical rods; the view showing an end of a holding member placed over a support member that engages the upper member of the floor support.

Stamped metal floor supports 92 are similar to floor supports 26 shown in FIGS. 2 and 3 in that stamped metal floor supports 92 and floor supports 26 provide support to planks 24. However, stamped metal floor supports 92 differ from floor supports 26 in that stamped metal floor supports 92 are formed of a stamped monolith sheet of material whereas floor supports 26 are formed by a plurality of components that are assembled together to form a single unit.

More specifically, in one arrangement, as is shown, stamped metal floor supports 92 are formed of folded sheet metal or folded sheet steel which extends a length, and includes a wave or weaving pattern, from a first end to a second end. Additionally, the stamped metal floor support 92 extends from a bottom where the stamped metal floor support 92 stands on the foundation 20, to a top where the stamped metal floor support 92 engages planks 24.

In the arrangement shown, as one example, stamped metal floor support 92 is formed of a single, unitary piece of metal sheet or metal steel which provides significant advantage over other known floor supports in the art. A single unitary piece reduces the need for additional labor, equipment, and materials invested in welding, bolting, gluing, affixing, or locking a plurality of components together, as is required with other floor supports known in the art. In one arrangement, as is shown, the stamped metal floor support 92 includes a plurality of passageways through the wall of the floor support 92 that allows for airflow in the hollow interior between the foundation 20 and the elevated floor 22.

In the arrangement shown, as one example, a plurality of stamped metal floor supports 92 are positioned across the foundation 20 in approximate equal-space alignment. In this way, this grid or array of stamped metal floor supports 92 provides even support for the planks 24 of elevated floor 22 to rest upon.

In the arrangement shown, as one example, a floor support 26, such as that shown in FIGS. 2 and 3, is positioned adjacent each outward side of grain bin unload system 50. Support members 12 are placed on the upper edge of floor supports 26 and extend over the elongated distance between floor supports 26 caused by grain bin unload system 50. Holding members 14 are placed over support members 12 and planks 24 of elevated floor 22 are placed over the combined support member 12 and holding member 14 assembly. In this way, a combination of floor supports 26 and stamped metal floor supports 92 are used in association with the combined support member 12 and holding member 14 assembly to provide additional support for elevated floor 22 over grain unload system 50.

Figure 8:
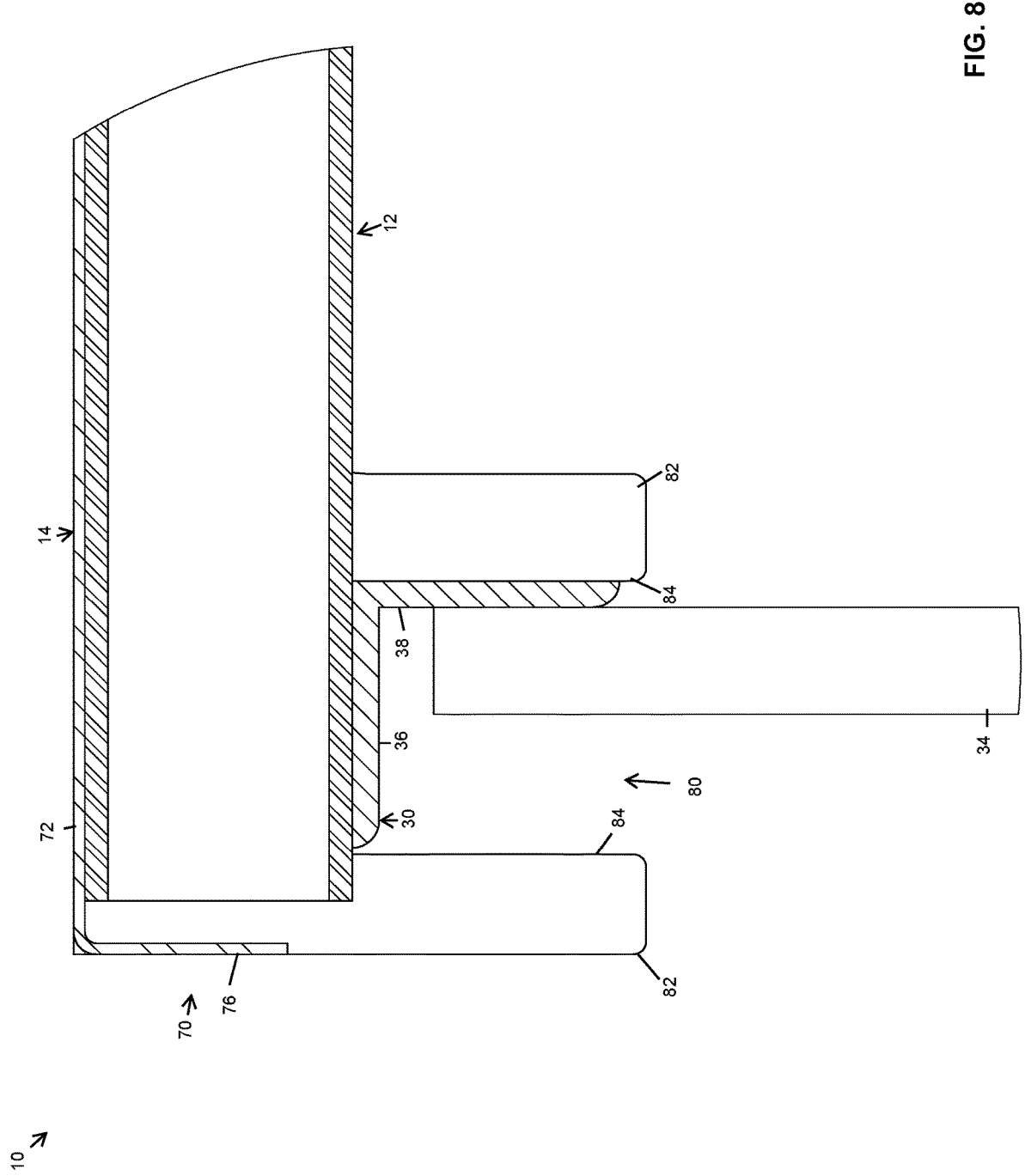
FIG. 8 is a section view of the upper member of a floor support; the view showing the floor support having an upper member formed of an L-shaped member and a middle member that connects at its upper end to the upper member; the view showing an end of a holding member placed over a support member that engages the upper member of the floor support; the view showing the support member placed within the hollow interior of the holding member and held in place by the interior surfaces of opposing sidewalls, the lower surface of the center wall and the interior surfaces of opposing end walls of the holding member; the view showing the end of the support member terminating just before the interior surface of the end wall of the holding member; the view showing the exterior surface of the side tab of the upper member of the floor support in flat and flush engagement with the interior surface of the socket of the holding member; the view showing the upper tab of the upper member of the floor support in flat and flush engagement with the lower surface of an end of the support member.
Figure 9:
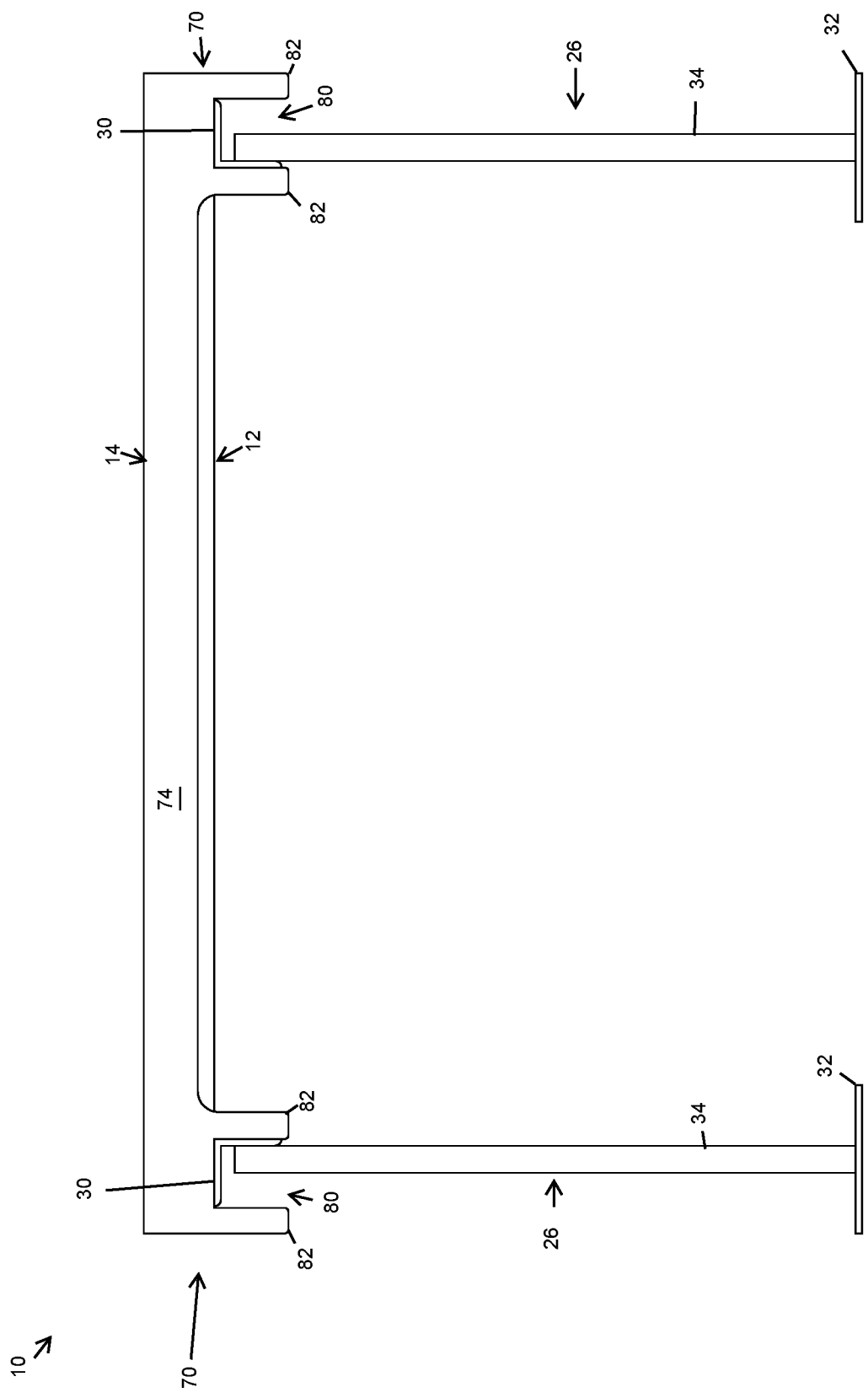
FIG. 9 is an elevation view of a pair of floor supports positioned in parallel spaced alignment to one another; the view showing the floor supports having an upper member formed of an L-shaped member, a lower member formed of a rectangular bar, and a middle member that extends between the upper member and the lower member that is formed of cylindrical rod; the view showing a holding member placed over a support member that bridges the increased distance between floor supports; the view showing the exterior surface of the side tab of the upper member of the floor support in flat and flush engagement with the interior surface of the socket of the holding member; the view showing the upper tab of the upper member of the floor support in flat and flush engagement with the upper edge the socket of the holding member.
Figure 10:
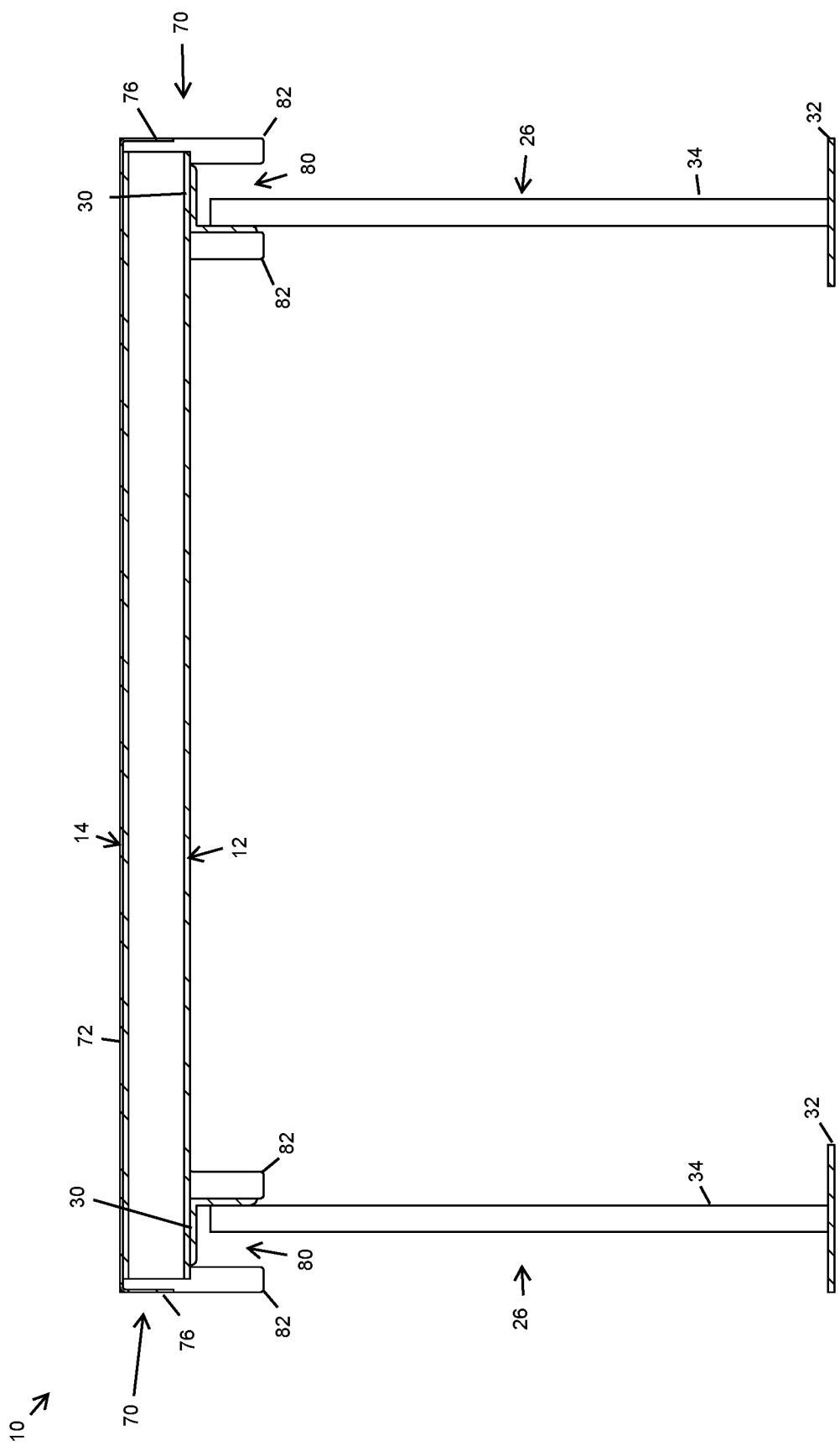
FIG. 10 is a section view of FIG. 9; the view showing the support member positioned within the holding member.
Figure 11:
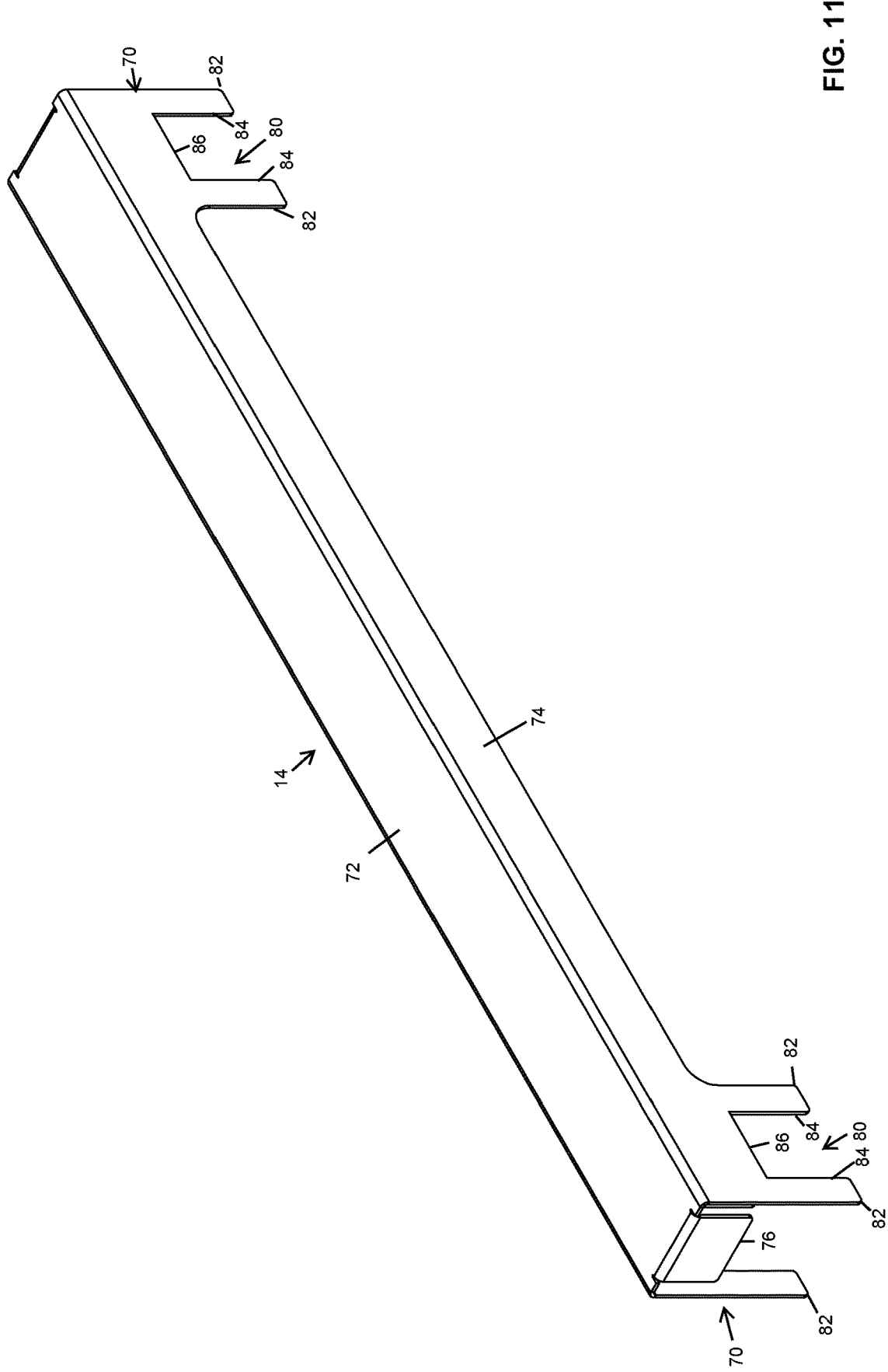
FIG. 11 is a perspective view of the upper side of a holding member.
Figure 12:
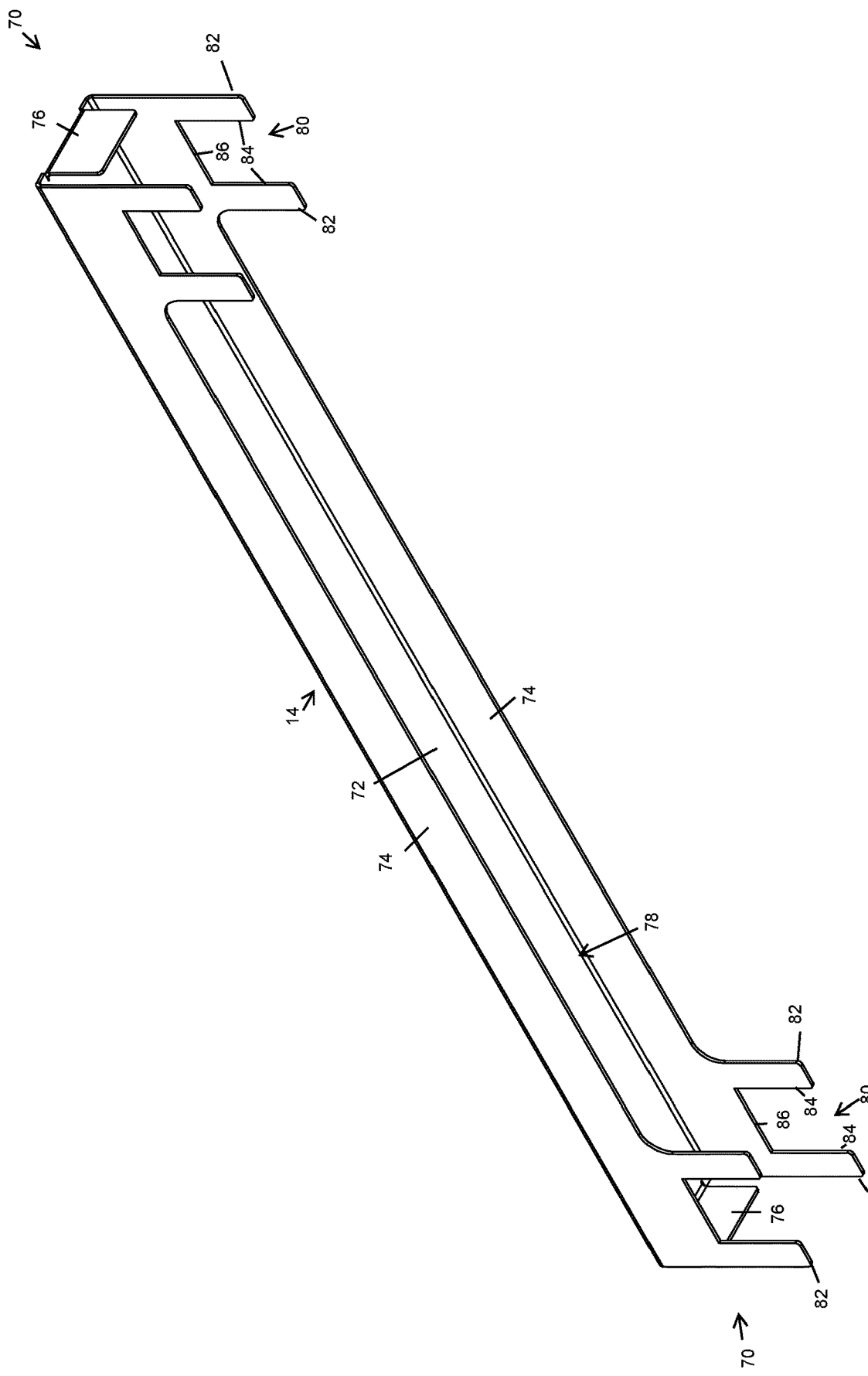
FIG. 12 is a perspective view of the lower side of a holding member; the view showing the hollow interior of the holding member.
Figure 13:
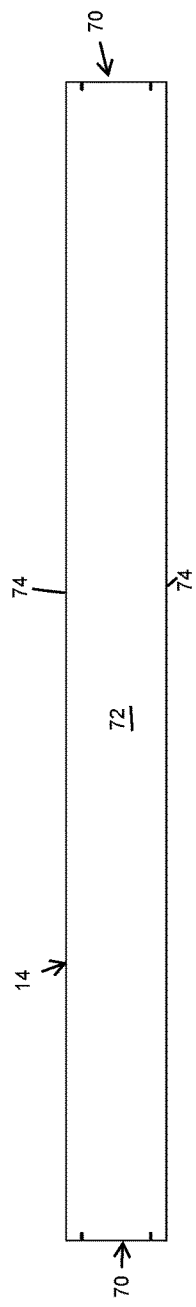
FIG. 13 is an elevation view of the top side of a holding member.
Figure 14:
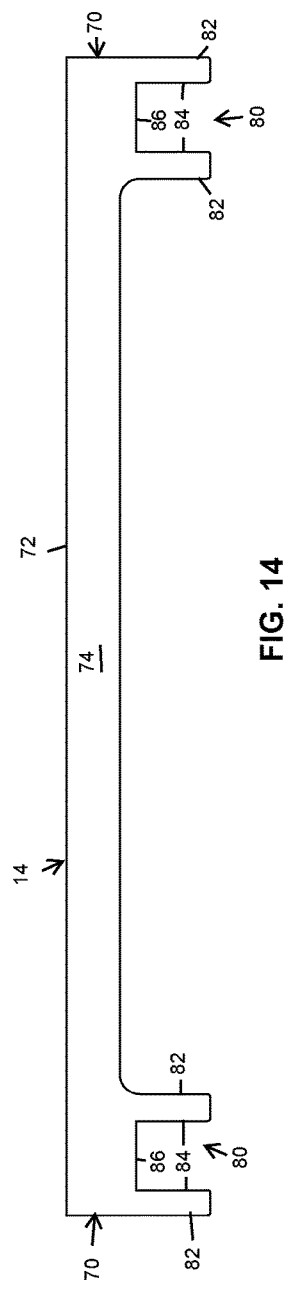
FIG. 14 is an elevation view of the side of a holding member.
Figure 15:
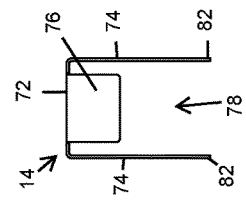
FIG. 15 is an elevation view of an end of a holding member.
Figure 16:
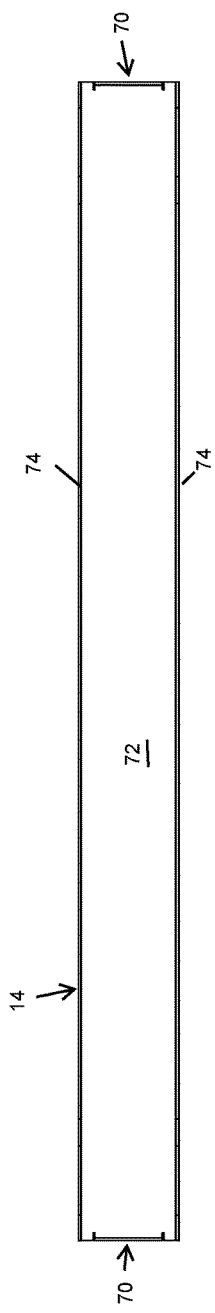
FIG. 16 is an elevation view of the lower side of a holding member.
Figure 17:
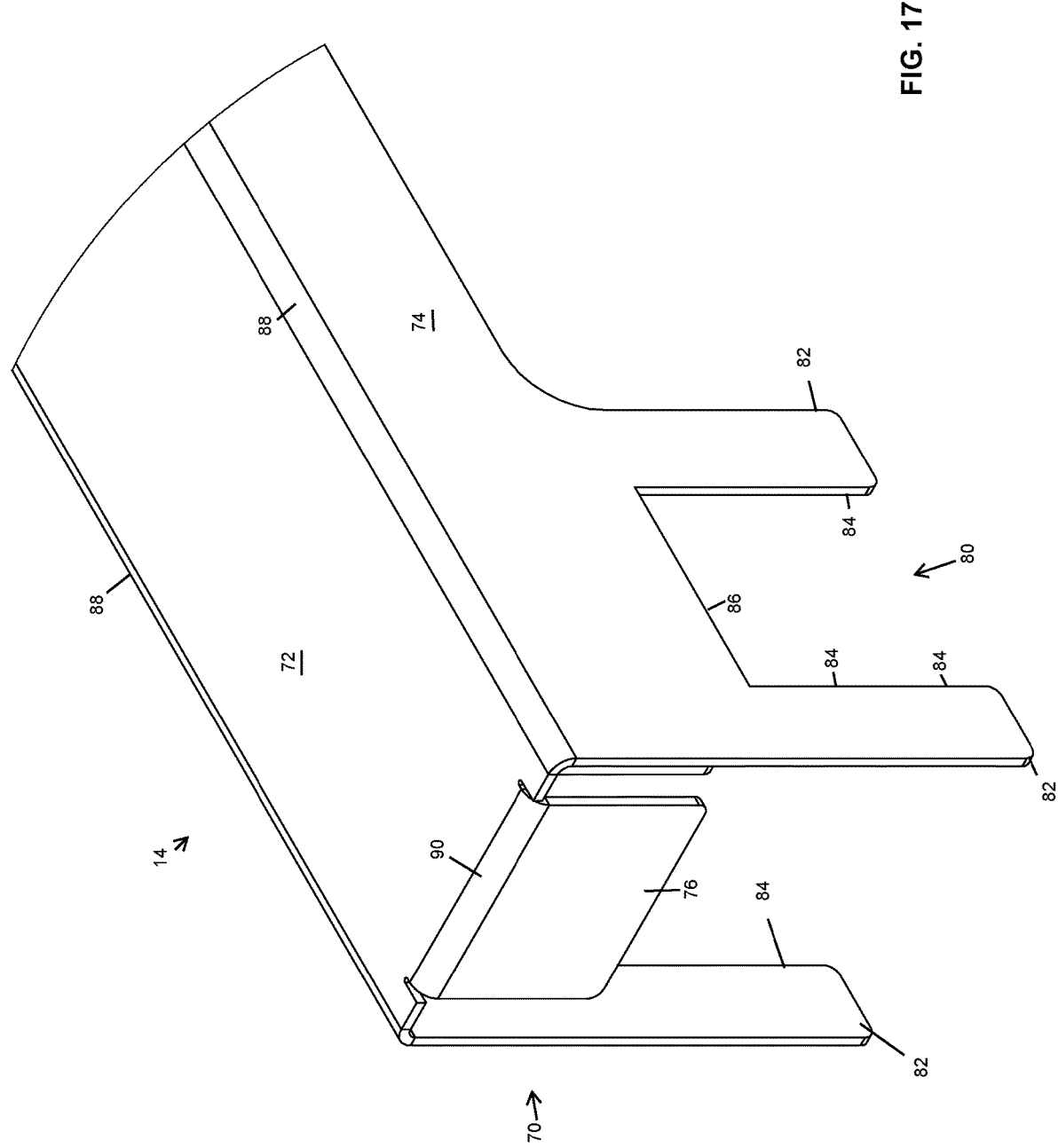
FIG. 17 is a close-up perspective view of a top side of an end of a holding member; the view showing the center of the holding member connecting at its outward edges to sidewalls; the view showing the ends of the sidewalls having sockets formed of opposing flanges; the view showing end walls connected to the outward ends of center wall.
Figure 18:
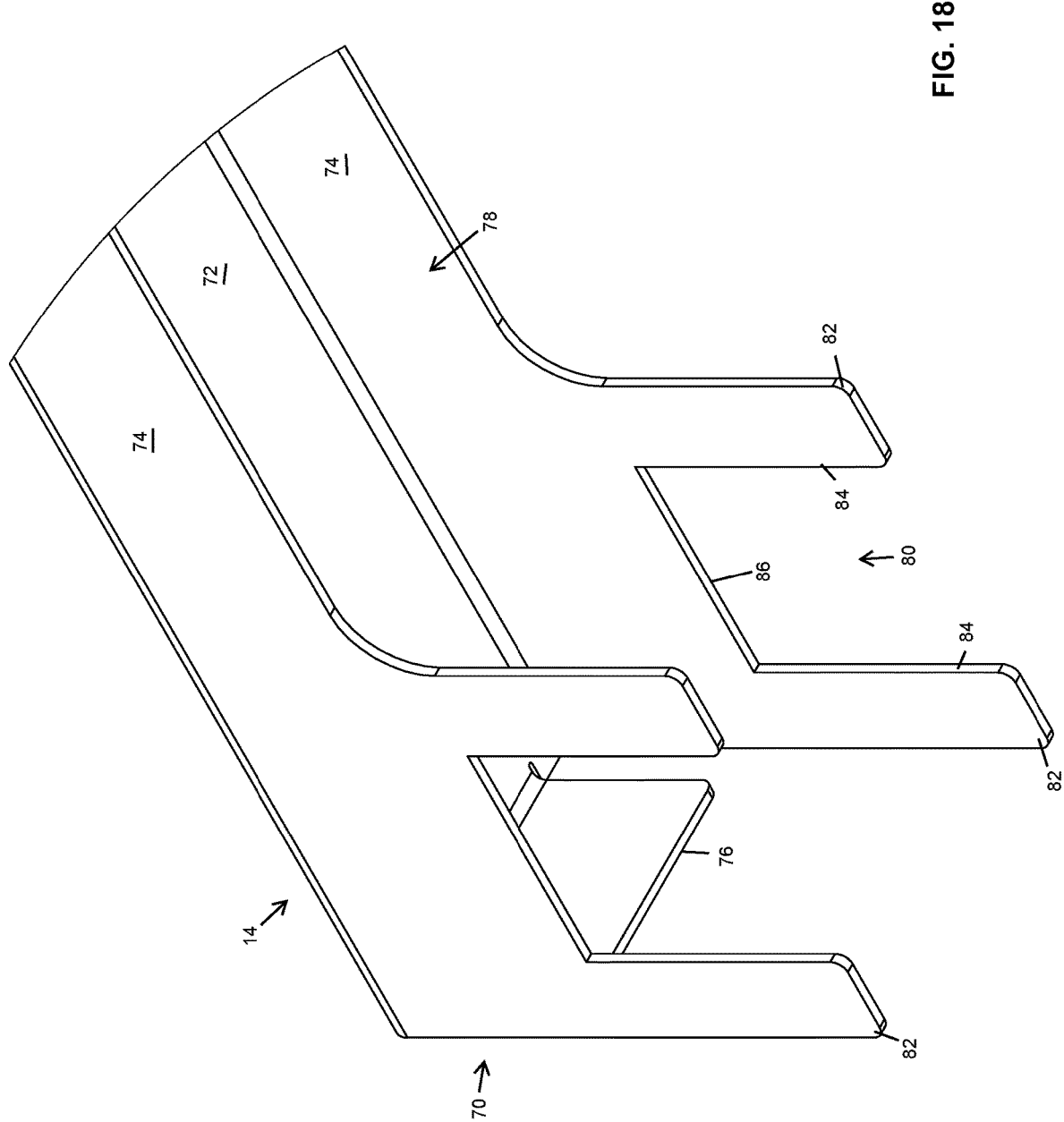
FIG. 18 is a close-up perspective view of a bottom side of an end of a holding member; the view showing the center of the holding member connecting to the sidewalls at its outward edges; the view showing the ends of the sidewalls having sockets formed of opposing flanges; the view showing end walls connected to the outward ends of center wall.

In Operation:

To form an elevated floor 22 using the bridge tube support system 10 within a grain bin 16, floor supports 26 and/or stamped metal floor supports 92 are placed on the foundation 20 of grain bin 16 in spaced relation to one another across the foundation 20. In the situation where an additional distance is required between two adjacent floor supports 26, such as in the case where a grain unload system 50 is installed within the space between the foundation 20 and the elevated floor 22, additional support is needed to prevent the elevated floor 22 from sagging or collapsing due to the additional space between floor supports 26 and/or stamped metal floor supports 92. In this situation, support members 12 are placed on top of the upper tab 36 of floor supports 26 bridging this additional gap over the grain unload system 50. In this arrangement, the outward end of support members 12 terminate at, near or just past the upper tab 36 of floor supports 26. In fact, the width of flanges or tabs 82 provides an amount of space between the outward end of upper member 30 of floor support 26 and the inward surface of end wall 76 of holding member 14. This provides some give or flexibility in the length of support members 12 and how they are installed. Or, said another way, the configuration of holding member 14 allows for some variability in the length of support member 12 as well as some variability as to how support members 12 are placed on the floor supports 26 during installation, which eases and speeds installation. This is shown in FIG. 8 as there is a space between the outward end of support member 12 and the inward end of end wall 76 of holding member 14.

Figure 7:
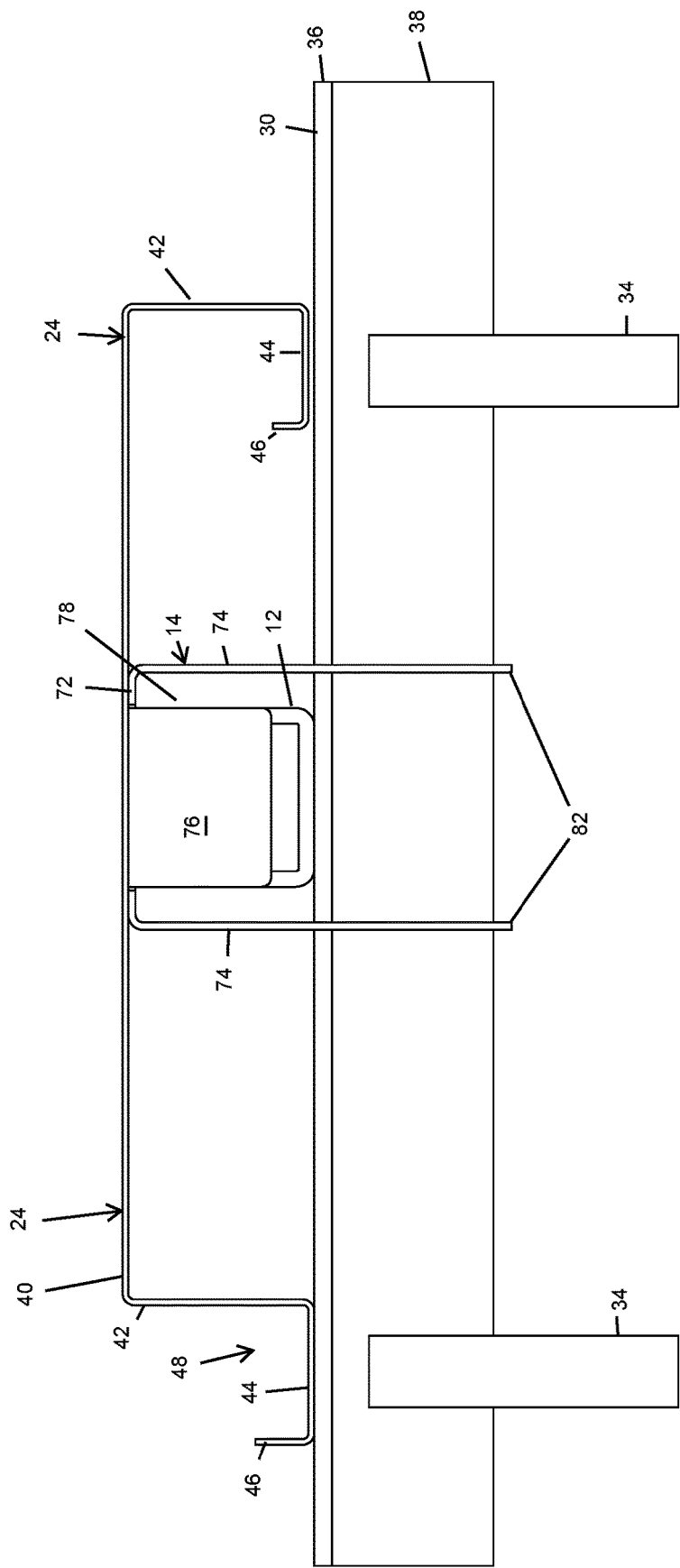
FIG. 7 is a close-up elevation view of an upper member of a floor support; the view showing the floor support having an upper member formed of an L-shaped member, and a plurality of middle members that connect at their upper end to the upper member; the view showing an end of a holding member placed over a support member that engages the upper member of the floor support; the view showing the support member placed within the hollow interior of the holding member and held in place by the interior surfaces of opposing sidewalls, the lower surface of the center wall and the interior surfaces of opposing end walls of the holding member; the view showing a plank of an elevated floor positioned over the support member, the view showing the plank formed of a center wall that connects at its outward edges to sidewalls that connect at their lower edges to end walls that connect at their ends to tabs that extend upward.

Similarly, when viewed from an end, the width of center wall 72 is slightly greater than the width of support member 12. This provides an amount of space between the outward side of support member 12 and the inward surface of sidewall 74 of holding member 14. This provides some give or flexibility in the width of support members 12 and how they are installed. Or, said another way, the configuration of holding member 14 allows for some variability in the width of support member 12 as well as some variability as to how support members 12 are placed on the floor supports 26 during installation, which eases and speeds installation. This is shown in FIG. 7 as there is a space between the outward side of support member 12 and the inward side of sidewalls 74 of holding member 14.

This configuration, with holding member 14 having additional space at the ends and sides of support member 12 allows for the use of dimensionally imprecise support members 12 as well as imprecise installation. In addition, the combined support member 12 and holding member 14 is substantially narrower than the space between the interior surface of sidewalls 42 of planks 24 of elevated floor 22. This allows for imprecise installation of the combined support member 12 and holding member 14 under plank 24, which also eases and speeds installation.

Once the support members 12 are placed on top of the upper tabs 36 of adjacent floor supports 26, holding members 14 are placed over the support members 12. More specifically, the hollow interior 78 of holding member 14 is placed over the support member 12 and the ends 70 of holding members 14 are aligned with the upper members 30 of floor supports 26 such that the socket 80 in the ends 70 of the holding member 14 fits over the upper members 30 of floor supports 26. Once in this position, the holding member 14 is lowered onto the support member 12 and the upper members 30 of adjacent floor supports 26.

When holding member 14 is lowered onto support member 12 and the upper members 30 of adjacent floor supports 26, the outward ends of support member 12 terminate just before the inward surface of end walls 76 in a spaced arrangement, within close tolerances, or in another arrangement in frictional engagement. When holding member 14 is lowered onto support member 12 and the upper members 30 of adjacent floor supports 26 the lower surface of center wall 72 is in approximate flat and flush planar engagement with the upper surface of support member 12. When holding member 14 is lowered onto support member 12 and the upper members 30 of adjacent floor supports 26, the outward sides of support member 12 are in a spaced arrangement, within close tolerances, or in another arrangement in frictional engagement with the interior surface of sidewalls 74 of holding member 14.

When holding member 14 is lowered onto support member 12 and the upper members 30 of adjacent floor supports 26, an inward edge 84 of sockets 80 is positioned in approximate flat and flush spaced alignment or planar frictional engagement with an outward surface of a side tab 38 of upper member 30 of floor support 26, while the opposing inward edge 84 of socket 80 is in spaced alignment or frictional engagement with the outward end of upper tab 36 of floor support 26, while the upper edge 86 of socket 80 is in approximate flat and flush spaced alignment or planar frictional engagement with the upper surface of upper tab 36 of upper member 30.

In this way, when holding member 14 is installed over support member 12 and the upper members 30 of floor supports 26, the holding member 14 holds the support member 12 in place and prevents the ends of the support member 12 from sliding off of the upper tabs 36 of upper members 30 of floor supports 26. In addition, the engagement between the socket 80 and the upper tab 36 and side tab 38 of upper member 30 of floor support 26 provides additional stability to the free standing floor supports 26 which helps to prevent the floor supports 26 from tipping over during assembly, from vibration, from air movement when fans are in use, or from any other disturbance.

Once the support members 12 and holding members 14 are installed on the floor supports 26 the elevated floor 22 is assembled on top of the floor supports 26. Elevated floor 22 is assembled by placing the lower surface of end walls 44 of planks 24 on top of the upper surface of upper tabs 36 of upper members 30 of floor supports 26. When assembling elevated floor 22, care is taken to place the end wall 44 and tab 46 that is positioned below the center wall 40 of one plank 24 in the socket 48 formed by the adjacent plank 24. Where present, when assembling elevated floor 22, care is also taken to align support members 12 and holding members 14 to fit within the hollow interior below the center wall 40 of planks 24, preferably in the middle of the hollow interior. When planks 24 are placed over support members 12 and holding members 14, the upper surface of center wall 72 of holding member 14 is in flat and flush planar engagement with the lower surface of center wall 40 of plank 24, and the lower surface of center wall 72 of holding member 14 is in flat and flush planar engagement with the upper surface of support member 12 of plank 24, and the lower surface of support member 12 is in flat and flush planar engagement with the upper surface of upper member 30 of floor support 26. In this way, strength In this position, the holding member 14 holds the support member 12 in place and the support member 12 provides strength and rigidity to prevent the planks 24 of elevated floor 22 from sagging or collapsing. That is, in this assembled position, direct engagement and direct contact is formed between the plank 24, holding member 14 and support member 12 thereby providing structural support to planks 24.

Notably, during installation, once the holding member 14 is placed over support member 12 the combined holding member 14 and support member 12 may be slid a length along the upper member 30 of floor support 24 so that the installer may find the perfect position for the combined holding member 14 and support member 12 within the hollow interior of plank 24. This adjustability eases and speeds installation. Notably, this system 10 does not require any screwing, bolting, pinning, riveting, snap-fitting, welding or otherwise affixing of the support member 12 and/or holding member 14 to floor supports 24. Instead, only a process of placing one component on top of the other is required for assembly. In addition, no tools are needed for assembly, only a user's hands. And, once assembled, gravity holds the components in place while the features of the components prevent movement critical directions (such as preventing support member 12 from sliding off of the upper members 30 of adjacent floor supports 24.

This installation process is repeated, plank 24 by plank 24, until the full elevated floor 22 is assembled.

Multiple Floor Supports:

In the arrangement shown, support members 12 and holding members 14 are shown extending across a pair of additionally spaced floor supports 26. It is hereby contemplated for use that support members 12 and holding members 14 may be used to extend across three, four or more floor supports 26. Extending support members 12 and holding members 14 across more than two floor supports 26 increases the strength of the system 10 by spreading the downward force across additional floor supports 26. In the arrangement wherein support members 12 and holding members 14 extend across more than two floor supports 26, holding member 14 includes sockets 80 that connect only to the outward-most floor supports 26. In another arrangement wherein support members 12 and holding members 14 extend across more than two floor supports 26, holding member 14 includes sockets 80 that connect to the outward-most floor supports 26 as well as the inward-positioned floor supports 26.

Multiple Support Members and/or Multiple Holding Members and Support Members:

In the arrangement shown, as one example, a single support member 12 is placed within the hollow interior 78 of holding member 14. However it is hereby contemplated for use that two, three, four or more support members 12 may be placed within a single holding member 14. Similarly, the arrangement shown, as one example, only a single combined support member 12 and holding member 14 is placed within the hollow interior of plank 24. However it is hereby contemplated for use that two, three, four or more combined support members 12 and holding members 14 may be placed within the hollow interior of a single plank 24. Or any combination of the above is hereby contemplated for use. In this way, additional strength may be provided to elevated floor 22 in countless ways using the system 10 presented herein.

From the above discussion it will be appreciated that the bridge tube support system that supports an elevated floor of a grain bin presented herein improves upon the state of the art. More specifically, and without limitation, it will be appreciated that the bridge tube support system that supports an elevated floor of a grain bin presented herein: provides adequate support to span increased distances; is fast to install; is efficient; is relatively inexpensive; is easy to install; holds a support member in place; can be used with practically any grain bin; can be used with practically any floor support; can be used with practically any elevated floor; does not require welding; does not require bolting; prevents a support member from escaping; uses a light duty holding member to hold a heavy duty support member; prevents sagging or collapse of the elevated floor; has a long useful life; is durable; utilizes simple manufacturing processes; has a robust design; is high quality; can be installed using conventional equipment and tools; can be installed by hand; helps to prevent the floor supports from tipping over; can be installed at adjustable distances; does not require fastening to the floor supports; does not require welding or bolting to form or install, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A floor support system for a grain bin, comprising:
a pair of floor supports;
the pair of floor supports positioned within a hollow interior of a grain bin;
the pair of floor supports placed on a foundation of the grain bin in spaced relation to one another;
a support member;
the support member placed on top of and extending between the pair of floor supports;
a holding member;
the holding member placed over the support member;
an elevated floor placed on the pair of floor supports;
wherein the holding member holds the support member in place on the pair of floor supports; and
wherein the support member provides bridging support for the elevated floor between the pair of floor supports; and
wherein the holding member includes flanges or tabs adjacent outward ends of the holding member that define one or more slots or grooves that receive a lip of an upper member of the pair of floor supports thereby forming a locking engagement between the holding member and the pair of floor supports.

2. The system of claim 1, wherein a grain unloading system is positioned between the pair of floor supports and below the support member and the holding member.

3. The system of claim 1, wherein the support member is a square tube.

4. The system of claim 1, wherein the holding member has a hollow interior that receives the support member therein.

5. The system of claim 1, wherein the holding member is formed of a sheet of material that is folded.

6. The system of claim 1, wherein the holding member includes an upper wall that is connected to opposing side walls and opposing end walls that form a hollow interior that receives and holds the support member therein; and
wherein the opposing end walls and the opposing side walls prevent the support member from moving outside of the hollow interior.

7. The system of claim 6, wherein the flanges or tabs adjacent outward ends of the holding member extend downward from the opposing side walls of the holding member and engage an upper member of the pair of floor supports.

8. The system of claim 6, wherein the opposing end walls extend downward from the upper wall.

9. The system of claim 6, wherein planes formed by the opposing end walls extends in approximate perpendicular alignment to a plane formed by one of the opposing side walls.

10. The system of claim 1, wherein the holding member engages an upper member of the pair of floor supports and holds the pair of floor supports thereby preventing the pair of floor supports from tipping over.

11. The system of claim 1,
wherein the grain bin includes the foundation and a sidewall, the sidewall forming the hollow interior.

12. A floor support system for a grain bin, comprising:
a pair of floor supports;
the pair of floor supports positioned within a hollow interior of a grain bin;
the pair of floor supports placed on a foundation in spaced relation to one another;
a support member;
the support member placed on top of and extending between the pair of floor supports;
a holding member;
the holding member having a hollow interior;
the holding member placed over the support member;
an elevated floor placed on the pair of floor supports;
wherein the holding member holds the support member in place on the pair of floor supports; and
wherein the support member provides bridging support for the elevated floor between the pair of floor supports; and
wherein the holding member includes an upper wall that is connected to opposing side walls and opposing end walls that form the hollow interior that receives and holds the support member therein.

13. The system of claim 12, wherein a grain unloading system is positioned between the pair of floor supports and below the support member and the holding member.

14. The system of claim 12, wherein the support member is a square tube.

15. The system of claim 12, wherein the holding member is formed of a sheet of material that is folded.

16. The system of claim 12, wherein the holding member includes flanges or tabs adjacent outward ends of the holding member that extend downward from the opposing side walls of the holding member and engage an upper member of the pair of floor supports.

17. The system of claim 12, wherein the holding member includes flanges or tabs adjacent outward ends of the holding member that define one or more slots or grooves that receive a lip of an upper member of the pair of floor supports thereby forming a locking engagement between the holding member and the pair of floor supports.

18. The system of claim 12, wherein the holding member engages an upper member of the pair of floor supports and holds the pair of floor supports thereby preventing the pair of floor supports from tipping over.

19. The system of claim 12,
wherein the grain bin includes the foundation and a sidewall, the sidewall forming the hollow interior.

20. A method of assembling a grain bin, the steps comprising;
placing a pair of floor supports in spaced relation on a foundation;
placing a support member across the pair of floor supports;
providing a holding member having a hollow interior;
placing the holding member over the support member such that the support member is held in place within the hollow interior of the holding member;
placing an elevated floor on the pair of floor supports;
supporting the elevated floor between the pair of floor supports by the support member; and
wherein the holding member includes flanges or tabs adjacent outward ends of the holding member that define one or more slots or grooves that receive a lip of an upper member of the pair of floor supports thereby forming a locking engagement between the holding member and the pair of floor supports.

21. The method of claim 20, further comprising the step of placing a grain unloading system between the pair of floor supports and below the support member and the holding member.

22. The method of claim 20, wherein the support member is a square tube.

23. The method of claim 20, wherein the holding member is formed of a sheet of material that is folded.

24. The method of claim 20, wherein the holding member includes an upper wall that is connected to opposing side walls and opposing end walls that form the hollow interior that receives and holds the support member therein.

25. The method of claim 24, wherein the flanges or tabs adjacent outward ends of the holding member extend downward from opposing side walls of the holding member and engage an upper member of the pair of floor supports.

26. The method of claim 20, wherein the holding member engages an upper member of the pair of floor supports and holds the pair of floor supports thereby preventing the pair of floor supports from tipping over.

27. A floor support system for a grain bin, comprising:
a support member;
the support member formed of a square tube;
a holding member;
the holding member formed of a folded member;
the holding member having a hollow interior;
wherein the support member is placed on top of a pair of spaced floor supports;
wherein the holding member is placed on top of the support member such that the support member is received within the hollow interior of the holding member;
a plank of an elevated floor;
wherein the plank of the elevated floor is placed on top of the combined holding member and support member placed on top of the spaced floor supports such that the combined holding member and support member provide additional support to the plank of the elevated floor as the plank spans the distance between the pair of spaced floor supports; and
wherein the holding member includes an upper wall that is connected to opposing side walls and opposing end walls that form the hollow interior that receives and holds the support member therein.

28. The system of claim 27, wherein the support member and holding member are installed on the pair of spaced floor supports without screwing, bolting, pinning or welding.

* * * * *